(12) United States Patent
Gardner et al.

(10) Patent No.: US 11,360,881 B2
(45) Date of Patent: Jun. 14, 2022

(54) CUSTOMIZING COMPUTER PERFORMANCE TESTS

(71) Applicant: MicroStrategy Incorporated, Vienna, VA (US)

(72) Inventors: Richard Gardner, Leesburg, VA (US); Clayton Myers, Oak Hill, VA (US); Andrew Smith, Oakton, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 17/028,565

(22) Filed: Sep. 22, 2020

(65) Prior Publication Data

US 2021/0089438 A1    Mar. 25, 2021

Related U.S. Application Data

(60) Provisional application No. 62/904,351, filed on Sep. 23, 2019.

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01); *G06F 11/3692* (2013.01)

(58) Field of Classification Search
CPC ............. G06F 11/3684; G06F 11/3688; G06F 11/3692
See application file for complete search history.

(56) References Cited

U.S. PATENT DOCUMENTS

| 5,758,071 | A | 5/1998 | Burgess et al. |
| 6,085,244 | A | 7/2000 | Wookey |
| 6,282,175 | B1 | 8/2001 | Steele et al. |
| 6,334,158 | B1 | 12/2001 | Jennyc et al. |
| 6,338,149 | B1 | 1/2002 | Ciccone, Jr. et al. |
| 6,339,795 | B1 | 1/2002 | Narukar et al. |
| 6,449,739 | B1 | 9/2002 | Landau |

(Continued)

OTHER PUBLICATIONS

U.S. Office Action in U.S. Appl. No. 16/582,874, dated May 19, 2021, 23 pages.

(Continued)

*Primary Examiner* — Joshua P Lottich
(74) *Attorney, Agent, or Firm* — Fish & Richardson P.C.

(57) ABSTRACT

Methods, systems, and apparatus, including computer programs encoded on computer storage media, for testing performance of server systems. In some implementations, a method includes identifying, by one or more computers, a resource provided by a server system. The method includes generating, by the one or more computers, a performance test for the server system. The performance test includes a series of operations that includes (i) providing the resource and (ii) responding to one or more interactions with the resource. The method includes performing one or more performance testing cycles that each include: causing the server system to perform the series of operations of the performance test; and evaluating one or more performance measures that characterize the performance of the series of operations by the server system.

21 Claims, 9 Drawing Sheets

(56) References Cited

U.S. PATENT DOCUMENTS

| | | |
|---|---|---|
| 6,473,794 B1 | 10/2002 | Guheen et al. |
| 6,691,067 B1 | 2/2004 | Ding et al. |
| 6,691,245 B1 | 2/2004 | DeKoning |
| 6,792,393 B1 | 9/2004 | Farel et al. |
| 6,816,871 B2 | 11/2004 | Lee |
| 6,934,934 B1 | 8/2005 | Baker et al. |
| 6,964,051 B1 | 11/2005 | Palaniappan |
| 6,993,747 B1 | 1/2006 | Friedman |
| 7,024,548 B1 | 4/2006 | O'Toole, Jr. |
| 7,035,919 B1 | 4/2006 | Eismann et al. |
| 7,047,177 B1 | 5/2006 | Eismann et al. |
| 7,051,098 B2 | 5/2006 | Masters et al. |
| 7,089,347 B2 | 8/2006 | Mogi et al. |
| 7,155,462 B1 | 12/2006 | Singh et al. |
| 7,197,559 B2 | 3/2007 | Goldstein et al. |
| 7,346,676 B1 | 3/2008 | Swildens et al. |
| 7,389,216 B1 | 6/2008 | Parent et al. |
| 7,523,447 B1 | 4/2009 | Callahan et al. |
| 7,552,438 B1 | 6/2009 | Werme et al. |
| 7,581,011 B2 | 8/2009 | Teng |
| 7,617,486 B2 | 11/2009 | Shanna et al. |
| 7,657,871 B2 | 2/2010 | Velupillai |
| 7,784,049 B1 | 8/2010 | Gandler |
| 7,802,174 B2 | 9/2010 | Teng et al. |
| 7,917,617 B1 | 3/2011 | Ponnapur et al. |
| 7,937,655 B2 | 5/2011 | Teng et al. |
| 8,024,299 B2 | 9/2011 | Dias et al. |
| 8,099,727 B2 | 1/2012 | Bahat et al. |
| 8,219,432 B1 | 7/2012 | Bradley et al. |
| 8,260,893 B1 | 9/2012 | Bandhole et al. |
| 8,285,681 B2 | 10/2012 | Prahlad et al. |
| 8,554,918 B1 | 10/2013 | Douglis |
| 8,583,769 B1 | 11/2013 | Peters et al. |
| 8,595,364 B2 | 11/2013 | Levy et al. |
| 8,595,714 B1 | 11/2013 | Hamer et al. |
| 8,612,599 B2 | 12/2013 | Tung et al. |
| 8,732,604 B2 | 5/2014 | Okamoto et al. |
| 8,805,970 B2 | 8/2014 | Breh et al. |
| 8,819,171 B2 | 8/2014 | Chakraborty et al. |
| 8,892,954 B1 | 11/2014 | Gray et al. |
| 8,990,778 B1 | 3/2015 | Allocca et al. |
| 9,047,017 B1 | 6/2015 | Dolan et al. |
| 9,053,220 B2 | 6/2015 | Banks et al. |
| 9,110,496 B1* | 8/2015 | Michelsen ............ G06F 9/45558 |
| 9,164,874 B1 | 10/2015 | Tonnay et al. |
| 9,166,895 B1 | 10/2015 | Sivaraman |
| 9,189,294 B2 | 11/2015 | Considine et al. |
| 9,262,150 B2 | 2/2016 | Haserodt |
| 9,268,663 B1 | 2/2016 | Siddiqui et al. |
| 9,270,449 B1 | 2/2016 | Tribble et al. |
| 9,311,161 B2 | 4/2016 | Jaglap |
| 9,367,305 B1 | 6/2016 | Kumar et al. |
| 9,424,172 B1 | 8/2016 | Helder |
| 9,436,535 B2 | 9/2016 | Ricken et al. |
| 9,491,072 B2 | 11/2016 | Raghunathan et al. |
| 9,531,604 B2 | 12/2016 | Akolkar et al. |
| 9,674,294 B1 | 6/2017 | Gonthier et al. |
| 9,716,624 B2 | 7/2017 | Zeyliger et al. |
| 9,733,921 B1 | 8/2017 | Saenz et al. |
| 9,762,450 B2 | 9/2017 | Xie |
| 9,766,962 B2 | 9/2017 | Dvir et al. |
| 9,767,312 B2 | 9/2017 | Sahoo et al. |
| 9,811,849 B2 | 11/2017 | Bursey |
| 9,820,224 B2 | 11/2017 | Hui et al. |
| 9,928,210 B1 | 3/2018 | Zhang et al. |
| 9,959,104 B2 | 5/2018 | Chen et al. |
| 9,965,261 B2 | 5/2018 | Chen |
| 9,986,427 B2 | 5/2018 | Kimpe |
| 10,002,247 B2 | 6/2018 | Suarez et al. |
| 10,007,509 B1 | 6/2018 | Quershi et al. |
| 10,169,023 B2 | 1/2019 | Ciano et al. |
| 10,191,778 B1 | 1/2019 | Yang et al. |
| 10,241,778 B2 | 3/2019 | Emeis et al. |
| 10,244,034 B2 | 3/2019 | Joshi et al. |
| 10,261,782 B2 | 4/2019 | Suarez et al. |
| 10,303,455 B2 | 5/2019 | Fitzgerald et al. |
| 10,310,949 B1 | 6/2019 | Chakraborty et al. |
| 10,318,280 B2 | 6/2019 | Islam et al. |
| 10,356,214 B2 | 7/2019 | Joshi et al. |
| 10,389,582 B1 | 8/2019 | Fakhouri et al. |
| 10,440,153 B1 | 10/2019 | Smith et al. |
| 10,452,440 B1 | 10/2019 | Odulinski et al. |
| 10,474,548 B2 | 11/2019 | Sanakkayala et al. |
| 10,803,411 B1 | 10/2020 | Smith |
| 10,810,041 B1 | 10/2020 | Myers et al. |
| 10,997,052 B2 | 5/2021 | Khosrowpour et al. |
| 10,997,135 B2 | 5/2021 | Zoll et al. |
| 11,102,330 B2 | 8/2021 | Gardner et al. |
| 11,102,331 B2 | 8/2021 | Smith et al. |
| 11,210,189 B2 | 12/2021 | Myers et al. |
| 2002/0065833 A1 | 5/2002 | Litvin |
| 2002/0122422 A1 | 9/2002 | Kenney et al. |
| 2002/0124243 A1 | 9/2002 | Broeksteeg et al. |
| 2002/0157089 A1 | 10/2002 | Patel et al. |
| 2002/0198985 A1 | 12/2002 | Fraenkel et al. |
| 2003/0135382 A1 | 7/2003 | Marejka et al. |
| 2004/0060044 A1 | 3/2004 | Das et al. |
| 2004/0068424 A1 | 4/2004 | Lee et al. |
| 2006/0129870 A1 | 6/2006 | Parent et al. |
| 2006/0236056 A1 | 10/2006 | Nagata |
| 2008/0077366 A1 | 3/2008 | Neuse et al. |
| 2008/0097960 A1 | 4/2008 | Dias et al. |
| 2008/0109448 A1 | 5/2008 | Aboel-Nil et al. |
| 2008/0115195 A1 | 5/2008 | Malek et al. |
| 2008/0163092 A1 | 7/2008 | Rao |
| 2008/0243660 A1 | 10/2008 | Amemiya et al. |
| 2008/0247314 A1 | 10/2008 | Kim et al. |
| 2008/0301663 A1 | 12/2008 | Bahat et al. |
| 2009/0018996 A1 | 1/2009 | Hunt et al. |
| 2009/0063699 A1 | 3/2009 | Chapweske et al. |
| 2009/0070462 A1 | 3/2009 | Saenz et al. |
| 2009/0282401 A1 | 11/2009 | Todorova |
| 2010/0153780 A1* | 6/2010 | Kirtkow ............ G06F 11/3684 |
| | | 714/37 |
| 2010/0162406 A1 | 6/2010 | Benameur et al. |
| 2010/0250487 A1 | 9/2010 | Gabriel et al. |
| 2010/0318986 A1 | 12/2010 | Burke et al. |
| 2011/0054968 A1 | 3/2011 | Galaviz |
| 2011/0055823 A1 | 3/2011 | Nichols et al. |
| 2011/0099290 A1 | 4/2011 | Swildens et al. |
| 2011/0145525 A1 | 6/2011 | Browne et al. |
| 2011/0314344 A1 | 12/2011 | Okamoto et al. |
| 2012/0096149 A1 | 4/2012 | Sunkara et al. |
| 2012/0117620 A1 | 5/2012 | Cassidy |
| 2012/0167094 A1 | 6/2012 | Suit |
| 2012/0198279 A1 | 8/2012 | Schroeder |
| 2012/0310765 A1 | 12/2012 | Masters |
| 2013/0042123 A1 | 2/2013 | Smith et al. |
| 2013/0054792 A1* | 2/2013 | Sharaf ................ G06F 11/3688 |
| | | 709/224 |
| 2013/0080514 A1 | 3/2013 | Gupta et al. |
| 2013/0197863 A1 | 8/2013 | Rayate et al. |
| 2013/0297769 A1 | 11/2013 | Chang et al. |
| 2013/0311740 A1 | 11/2013 | Watanabe et al. |
| 2013/0339299 A1 | 12/2013 | Muller et al. |
| 2014/0019387 A1 | 1/2014 | Cao et al. |
| 2014/0020048 A1 | 1/2014 | Snodgrass |
| 2014/0089033 A1 | 3/2014 | Snodgrass |
| 2014/0089505 A1 | 3/2014 | Haserodt et al. |
| 2014/0156839 A1 | 6/2014 | Swildens et al. |
| 2014/0165063 A1 | 6/2014 | Shiva et al. |
| 2014/0282456 A1 | 9/2014 | Drost et al. |
| 2014/0331209 A1 | 11/2014 | Singh |
| 2014/0331225 A1 | 11/2014 | Helander et al. |
| 2014/0358944 A1 | 12/2014 | Brower, Jr. et al. |
| 2015/0019195 A1 | 1/2015 | Davis |
| 2015/0019197 A1 | 1/2015 | Higginson |
| 2015/0019488 A1 | 1/2015 | Balch et al. |
| 2015/0019706 A1 | 1/2015 | Raghunathan et al. |
| 2015/0081574 A1 | 3/2015 | Selby et al. |
| 2015/0089479 A1 | 3/2015 | Chen et al. |
| 2015/0095892 A1 | 4/2015 | Baggott et al. |
| 2015/0100829 A1 | 4/2015 | Nanjundappa et al. |
| 2015/0178052 A1 | 6/2015 | Gupta et al. |

(56) References Cited

U.S. PATENT DOCUMENTS

| | | |
|---|---|---|
| 2015/0220426 A1 | 8/2015 | Spektor et al. |
| 2015/0242636 A1 | 8/2015 | Khan et al. |
| 2015/0295792 A1 | 10/2015 | Cropper et al. |
| 2015/0326432 A1 | 11/2015 | Fujie et al. |
| 2015/0373097 A1 | 12/2015 | Konkus et al. |
| 2016/0026555 A1 | 1/2016 | Kuo et al. |
| 2016/0044040 A1 | 2/2016 | Caffary, Jr. |
| 2016/0055067 A1 | 2/2016 | Bensinger |
| 2016/0072730 A1 | 3/2016 | Jurban et al. |
| 2016/0132320 A1 | 5/2016 | Fitzgerald et al. |
| 2016/0139887 A1 | 5/2016 | Pudiyapura et al. |
| 2016/0164738 A1 | 6/2016 | Pinski et al. |
| 2016/0277249 A1 | 9/2016 | Singh et al. |
| 2016/0335106 A1 | 11/2016 | Behere et al. |
| 2016/0335108 A1 | 11/2016 | Ryu et al. |
| 2016/0337186 A1 | 11/2016 | Dolinsky et al. |
| 2016/0344610 A1 | 11/2016 | Robinette |
| 2016/0350205 A1 | 12/2016 | Acharya et al. |
| 2016/0371170 A1 | 12/2016 | Salunke et al. |
| 2017/0041201 A1 | 2/2017 | Ilyadis et al. |
| 2017/0061313 A1 | 3/2017 | Oros et al. |
| 2017/0090972 A1 | 3/2017 | Ryu et al. |
| 2017/0147319 A1 | 5/2017 | Riek et al. |
| 2017/0154017 A1 | 6/2017 | Kristiansson et al. |
| 2017/0177860 A1 | 6/2017 | Suarez et al. |
| 2017/0185488 A1 | 6/2017 | Kumarasamy et al. |
| 2017/0270455 A1 | 9/2017 | Chi et al. |
| 2017/0295199 A1 | 10/2017 | Kirti et al. |
| 2017/0300311 A1 | 10/2017 | Lopez et al. |
| 2017/0315795 A1 | 11/2017 | Keller |
| 2018/0013616 A1 | 1/2018 | Abadi et al. |
| 2018/0075086 A1 | 3/2018 | Yam et al. |
| 2018/0088926 A1 | 3/2018 | Abrams |
| 2018/0088935 A1 | 3/2018 | Church et al. |
| 2018/0095778 A1 | 4/2018 | Aydelot et al. |
| 2018/0095973 A1 | 4/2018 | Huang et al. |
| 2018/0136931 A1 | 5/2018 | Hendrich et al. |
| 2018/0157516 A1 | 6/2018 | Kristiansson et al. |
| 2018/0173502 A1 | 6/2018 | Biskup et al. |
| 2018/0173522 A1 | 6/2018 | Hamill et al. |
| 2018/0205652 A1 | 7/2018 | Saxena |
| 2018/0267908 A1 | 9/2018 | Pan et al. |
| 2018/0285199 A1 | 10/2018 | Mitkar et al. |
| 2018/0285210 A1 | 10/2018 | Mitkar et al. |
| 2018/0285246 A1* | 10/2018 | Tuttle .................. H04L 47/82 |
| 2018/0285353 A1 | 10/2018 | Rao et al. |
| 2018/0287902 A1 | 10/2018 | Chitalia et al. |
| 2018/0288129 A1 | 10/2018 | Joshi et al. |
| 2018/0341471 A1 | 11/2018 | Stefanov et al. |
| 2019/0034313 A1 | 1/2019 | Vedurumudi et al. |
| 2019/0050680 A1 | 2/2019 | Waugh et al. |
| 2019/0095254 A1 | 3/2019 | Rao |
| 2019/0102204 A1 | 4/2019 | Khosrowpour et al. |
| 2019/0109822 A1 | 4/2019 | Clark et al. |
| 2019/0109857 A1 | 4/2019 | Caffary, Jr. |
| 2019/0132329 A1 | 5/2019 | Verberkt et al. |
| 2019/0163559 A1 | 5/2019 | Takahashi et al. |
| 2019/0208031 A1 | 7/2019 | Bennet et al. |
| 2019/0213068 A1 | 7/2019 | Upadhyay |
| 2019/0230130 A1 | 7/2019 | Beckman et al. |
| 2019/0235897 A1 | 8/2019 | Goel |
| 2019/0236844 A1 | 8/2019 | Balasian et al. |
| 2019/0260716 A1 | 8/2019 | Lerner |
| 2019/0278669 A1 | 9/2019 | Mueller-Wicke et al. |
| 2019/0288956 A1 | 9/2019 | Pulier et al. |
| 2019/0303541 A1 | 10/2019 | Reddy et al. |
| 2019/0312800 A1 | 10/2019 | Schibler et al. |
| 2019/0317829 A1 | 10/2019 | Brown et al. |
| 2019/0342425 A1 | 11/2019 | Cheng et al. |
| 2019/0354389 A1 | 11/2019 | Du et al. |
| 2019/0392045 A1 | 12/2019 | De Lima Junior et al. |
| 2020/0019393 A1 | 1/2020 | Vichare et al. |
| 2020/0067763 A1 | 2/2020 | Vytla |
| 2020/0081814 A1* | 3/2020 | Srinivasan ................ G06F 8/71 |
| 2020/0099773 A1 | 3/2020 | Myers et al. |
| 2020/0112624 A1 | 4/2020 | Smith et al. |
| 2020/0119979 A1 | 4/2020 | Woodland et al. |
| 2020/0135264 A1 | 4/2020 | Brady |
| 2020/0177634 A1 | 6/2020 | Hwang et al. |
| 2020/0204465 A1 | 6/2020 | Baker et al. |
| 2020/0249962 A1 | 8/2020 | Vichare et al. |
| 2020/0257612 A1* | 8/2020 | Lang .................. G06F 11/3612 |
| 2020/0272786 A1* | 8/2020 | Pandurangarao ... G06F 11/3692 |
| 2020/0293436 A1 | 9/2020 | Carames et al. |
| 2020/0356806 A1 | 11/2020 | Li et al. |
| 2020/0366572 A1 | 11/2020 | Chauhan |
| 2020/0394120 A1 | 12/2020 | Salmi et al. |
| 2021/0019321 A1 | 1/2021 | Ehrlich et al. |
| 2021/0042141 A1 | 2/2021 | De Marco et al. |
| 2021/0048995 A1 | 2/2021 | Myers et al. |
| 2021/0048998 A1 | 2/2021 | Myers et al. |
| 2021/0049002 A1 | 2/2021 | Myers et al. |
| 2021/0064262 A1 | 3/2021 | Myers et al. |
| 2021/0064492 A1 | 3/2021 | Myers et al. |
| 2021/0065078 A1 | 3/2021 | Gardner et al. |
| 2021/0067406 A1 | 3/2021 | Myers et al. |
| 2021/0067607 A1 | 3/2021 | Gardner et al. |
| 2021/0073026 A1 | 3/2021 | Myers et al. |
| 2021/0081298 A1 | 3/2021 | Gardner et al. |
| 2021/0092015 A1 | 3/2021 | Gardner et al. |
| 2021/0124610 A1 | 4/2021 | Gardner et al. |

OTHER PUBLICATIONS

U.S. Office Action in U.S. Appl. No. 16/582,874, dated Nov. 13, 2020, 21 pages.

doc-archives.microstrategy.com [online], "Installation and Configuration Guide," Sep. 2018, retrieved Mar. 20, 2020, retrieved from URL <https://doc-archives.microstrategy.com/prodncthelp/10.11/manuals/en/InstallationConfig.pdf>, 527 pages.

www2.microstrategy.com [online], "OperationsManager Guide" 2016, retrieved on Mar. 20, 2020 retrieved from URL <https://www2.microstrategy.com/producthelp/10.4/manuals/en/OperationsManager.pdf>, 154 pages.

Abhors et al., "An Automated Approach for Creating Workload Models from Server Log Data " 9th Intl Conf. on Software Engineering and Applications, 2014, pp. 1-12.

doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>, 2 pages.

docs.docker.com [online], "Get Stalled, Part 1: Orientation and setup," 2017, retrieved on Oct. 25, 2019, retrieved from URL<https://docs.docker.com/get-started/>, 6 pages.

dyn.com "Kubernetes: The Difference Between Containers and Virtual Machines," Feb. 2018, retrieved on Oct. 25, 2019, retrieved from URL <https://dyn.com/blog/kubernetes-the-difference-between-containers-and-virtual-machines/>, 8 pages.

edureka.co [online], "Docker tutorial—Introduction to docker & containerization," 2017, retrieved on Oct. 25, 2019, retrieved from URL <https://www.edureka.co/blog/docker-tutorial>, 10 pages.

GWS Advisory [online], "What's New in Microstrategy 2019", Jan. 2019, retrieved on Oct. 8, 2021, retrieved from URL < https://www.gwsadvisory.com/wp-content/uploads/2019/01/whats-new-in-microstrategy-2019.pdf >, 138 pages.

kubernetes.io [online], " Concepts underlying the cloud controller manager," May 2019, retrieved on Jun. 20, 2019, retrieved from URL <https://kubernetes.io/docs/concepts/architecture/cloud-controller/>, 9 pages.

kubernetes.io [online], "StatefulSet is the workload API object used to manage stateful applications," Jun. 2019, retrieved on Jun. 20, 2019, retrieved from URL <https://kubernetes.io/docs/concepts/workloads/controllers/statefulset/>, 9 pages.

linkedin.com [online], "Moving MicroStrategy to a docker/kubernetes infrastructure," Jan. 2018, retrieved from Oct. 25, 2019 retrieved from URL <https://www.linkedin.com/pulse/moving-microstrategy-dockerkubernetes-infrastructure-montero/>, 3 pages.

(56) References Cited

OTHER PUBLICATIONS linuxize.com [online], "How to Remove Docker Containers, Images, Volumes, and Networks," Oct. 2018, retrieved on Oct. 25, 2019, retrieved from URL <https://linuxize.com/post/how-to-remove-docker-images-containers-volumes-and-networks/#remove-one-or-more-containers>, 11 pages.
Ma et al., "Efficient service handoff across edge servers via docker container migration author:," SEC'17: Proceedings of the Second ACM/IEEE Symposium on Edge Computing, 2017, 11:1-13.
MicroStrategy [online], "MicroStrategy 10.9 Readme", 2017, retrieved on Oct. 5, 2021, 124 pages.
MicroStrategy [online], "System Administration Guide", 2018, retrieved on Oct. 5, 2021, 831 pages.
MicroStrategy [online], "Tools to Upgrade with Confidence", Feb. 4, 2019, retrieved on Oct. 12, 2021, 26 pages.
MicroStrategy [online], "Upgrade Guide—Upgrading your MicroStrategy Enterprise Software", Jun. 2016, retrieved on Oct. 8, 2021, retrieved from URL <https://doc-archives.microstrategy.com/producthelp/10.4/manuals/en/UpgradeGuide.pdf >, 109 pages.
MicroStrategy [online], "Upgrade Guide—Version 10", 2015. retrieved on Oct. 8, 2021, retrieved from URL <https://doc-archives.microstrategy.com/producthelp/10/manuals/en/UpgradeGuide.pdf >, 118 pages.
MicroStrategy [online], "Upgrade Guide—Version 10. 9", Sep. 2017, retrieved on Oct. 8, 2021, retrieved from URL <https://www2.microstrategy.com/producthelp/10.9/manuals/en/UpgradeGuide.pdf>, 90 pages.
MicroStrategy [online], "Upgrade Guide—Version 10.11", Jun. 2018, retrieved on Oct. 8, 2021, retrieved from URL <https://www2.microstrategy.com/producthelp/10.11/manuals/en/UpgradeGuide.pdf >, 92 pages.
MicroStrategy.com [online],"Microstrategy on Kubernetes," 2017, retrieved on Oct. 25, 2019, retrieved from URL <https://www.microstrategy.com/getmedia/d99b44dc-ec44-451b-a5a3-3db7160282f0/Genesys-How-to-tun-MicroStrategy-on-Kubernetes>, 10 pages.
Pederson, "Testing SharePoint Apps in Production (Canary Release)", Simon J.K. Pedersen's Azure & Docker blog, 2014, 1-9.
Singh et al., "Container-based microservice architecture for cloud applications," 2017 International Conference on Computing, Communication and Automation (ICCCA), May 2017, 847-52.
stackoverflow.com [online] "What's the difference between ClusterIP, NodePort and LoadBalancer service types in Kubernetes?" Jan. 2017, retrieved from URL <http://stackoverflow.com/questions/41509439/whats-the-difference-between-clusterip-nodeport-and-loadbalancer-service-types/52241241#52241241>, 6 pages.

Tao et al., "Dynamic Resource Allocation Algorithm for Container-based Service Computing"; 2017 IEEE 13th International Symposium on Autonomous Decentralized Systems—2017 IEEE, 61-67.
Tuton, "Deploy a MongoDB replica set using the IBM Cloud Kubernetes Service," IBM Developer, Mar. 15, 2018, 14 pages.
U.S. Office Action in U.S. Appl. No. 16/557,482, dated Jun. 8, 2021, 7 pages.
U.S. Office Action in U.S. Appl. No. 16/557,482, dated Nov. 30, 2020, 13 pages.
U.S. Office Action in U.S. Appl. No. 16/787,596, dated Nov. 25, 2020, 11 pages.
U.S. Office Action in U.S. Appl. No. 16/582,874, dated Mar. 12, 2021, 15 pages.
U.S. Office Action in U.S. Appl. No. 16/582,874 , dated Sep. 16, 2021, 30 pages.
U.S. Office Action in U.S. Appl. No. 17/005,657, dated Dec. 27, 2021, 33 pages.
U.S. Office Action in U.S. Appl. No. 16/557,713, dated Aug. 5, 2021, 39 pages.
U.S. Office Action in U.S. Appl. No. 16/557,713, dated Feb. 24, 2021, 34 pages.
U.S. Office Action in U.S. Appl. No. 16/557,713, dated Nov. 13, 2020, 25 pages.
wikipedia.org [online], "Docker(software)," Mar. 2013, retrieved on Oct. 25, 2019, retrieved from URL <https://en.wikipedia.org/wiki/Docker_(software)>, 8 pages.
wikipedia.org [online], "OS-level virtualization," Aug. 2006, retrieved on Oct. 25, 2019, retrieved from URL <https://en.wikipedia.org/wiki/OS-level_virtualization>, 4 pages.
wikipedia.org [online], "System Image," Feb. 2013, retrieved Oct. 25, 2019, retrieved from URL <https://en.wikipedia.org/wiki/System_image>, 2 pages.
Wong, "What's the Difference Between Containers and Virtual Machines?," Jul. 15, 2016, Electronic Design, retrieved from URL <http://electronicdesign.com/ dev-tools /what-s-difirence-between-containers-and-virtualmachines>,3 pages.
www.en.wikipedia.org [online], "Online Analytical Processing" Mar. 2018, retrieved on Mar. 19, 2020, retrieved from URL <https://en.wikipedia.org/wiki/Online_analytical_processing>, 14 pages.
www2.microstrategy.com [online], "MicroStrategy Intelligence Server," Apr. 2019, retrieved on Oct. 25, 2019, retrieved from URL <https://www2.microstrategy.com/producthelp/10.4/ProjectDesignGuide/WebHelp/Lang_1033/Content/ProjectDesign/MicroStrategy_Intelligence_Server.htm>, 2 pages.
Xu et al., "Mining Container Image Repositories for Software Configuration and Beyond," 2018 ACM/IEEE 40th International Conference on Software Engineering: New Ideas and Emerging Results—ICSE-NIER'18, May 27-Jun. 3, 2018, 4 pages.

* cited by examiner

*200a*

| DATE: MARCH 11, 2019 | | | | |
|---|---|---|---|---|
| TASK | REQUEST TIME | RESPONSE TIME | RENDERED TIME | TOTAL TIME |
| Report 1 | 12:00:00:02 | 12:00:00:74 | 12:00:01:34 | 1.32 |
| Report 2 | 12:00:01:35 | 12:00:02:64 | 12:00:03:38 | 2.03 |
| Report 3 | 12:00:03:39 | 12:00:03:56 | 12:00:04:28 | 0.89 |
| Dashboard 1 | 12:00:04:29 | 12:00:05:00 | 12:00:05:29 | 1.00 |
| Dashboard 2 | 12:00:05:30 | 12:00:05:49 | 12:00:06:03 | 0.73 |
| Report 1 | 12:00:06:04 | 12:00:06:72 | 12:00:07:25 | 1.21 |
| | *206* | *208* | *210* | *212* |
| *204* | | | | *202* |
| DATE: MARCH 10, 2019 | | | | |

FIG. 2A

| ITEM | TASK | AVERAGE: PAST 2 DAYS | AVERAGE: PAST 20 DAYS | PERCENT CHANGE |
|---|---|---|---|---|
| Report 1 | Execute | 1.03 | 3.28 | 68.69 |
| Report 1 | Execute & Filter | 2.73 | 5.67 | 51.89 |
| Report 2 | Execute | 1.20 | 5.48 | 78.06 |
| Report 2 | Execute & Filter | 4.68 | 4.16 | -12.55 |
| } 222 | } 224 | } 226 | } 228 | } 230 |

CUSTOMIZING COMPUTER PERFORMANCE TESTS

CROSS REFERENCE TO RELATED APPLICATION

This application claims the benefits of U.S. Provisional Application No. 62/904,351, filed Sep. 23, 2019, the contents of which are incorporated by reference herein.

TECHNICAL FIELD

The present specification relates to testing and monitoring performance of computer systems.

BACKGROUND

Various techniques are used to test computer systems. However, many testing methods do not effectively indicate what an end-user actually experiences.

SUMMARY

In some implementations, a computer system can create performance tests for monitoring the performance of other computer systems, such as server systems. For example, a management system can record actions performed by users of a server system over time. The management system can analyze the user actions to identify a commonly performed user action sequence. The management system can then develop a performance test for the server system based on the particular user action sequence, e.g., a test that simulates the most common actions involving a particular document or other resource. This allows the management system to automatically create performance tests that simulate actions that users are commonly performing. In this manner, the performance tests that are generated measure performance of not only loading of documents, but other performance for actions that users perform, such as scrolling, filtering, interacting with interactive controls, and so on. Testing these user interactions can reveal performance bottlenecks and errors that normally would not appear when simply measuring response times for providing resources. The performance tests can then be run in a repeated manner, to provide a substantially real-time indication of current performance.

A computer system can perform ongoing performance testing of other computer systems to monitor the quality of experience that is provided to end users. For example, a management system can run a headless web browser and issue requests to a server in a way that simulates users making requests to the server. The management system determines the server's response time for each request (e.g., the duration from the time of the request to the time of the server's response that fulfills the request). This allows the management system to measure the amount of delay that a user would experience after making a request to the server. This type of testing can be performed for a variety of types of tasks, and can be done repeatedly to maintain an ongoing, up-to-date measure of the level of performance of the server. In many cases, the ongoing stream of response time information obtained in this way can serve as a "heartbeat" or substantially real-time and continually refreshed measure of the status of the server.

The requests that the management system sends for monitoring purposes can be requests to perform the same types of actions or tasks that actual users commonly request, such as running reports, generating documents, loading a data cube, processing a query, and so on. The management system may automatically select the tasks for monitoring from usage logs or other data about how users interact with a computer system over time. The tasks used for monitoring can re-create specific actions and tasks that users have actually performed. For example, the requests to a server may be to load each of the 10 documents most frequently accessed by users over a time period, such as the previous week. As another example, a request might be to run a query identified from usage logs as being issued frequently by users. The monitoring system can automatically select the tasks to perform for monitoring purposes, for example, to include the most commonly performed actions of different types. As another example, the monitoring system may determine the set of tasks to be performed based on a predetermined signal or input from an administrator. For example, an administrator my specify specific reports or documents whose loading performance should be monitored, by placing the reports in a specific folder, listing the reports in a user interface or file, using a naming convention for the reports that signals whether performance is to be monitored, and so on. In other cases, a user may specify that all reports in a particular library or all reports available to a server should be monitored.

To further the goal of measuring performance experienced by end users, the monitoring system may perform tasks that represent different aspects that rely on a server system to be monitored. As an example, one task used for monitoring may be to generate a particular document. Another task used for monitoring may be to navigate to a particular portion within the document. Another task used for monitoring may be to enter filter criteria and apply the filter criteria to the document. As another example, processing a query to return results may be another task used for monitoring. Any task or action that relies on processing by the server may be instructed to be performed and the performance of the server (e.g., the length of time until the server completes the action) for the task monitored.

To carry out the performance monitoring, the management server can schedule tasks to run continually on monitored servers. This can involve requesting a server to perform monitoring tasks periodically, for example, by sending requests at regular intervals such as every minute, every 5 minutes, every 15 minutes, etc. The management server may select a set of tasks to monitor, and then may use a headless browser to request a monitored server to initiate each of the selected tasks at each interval. In some implementations, the management server issues the request for each task one-by-one in sequence, so that the server responds to the current monitored task before the management server requests the next monitoring task be performed. The management server can repeat the same series of tasks multiple times, and in some cases may initiate another round of performing the monitoring tasks as soon as the current round of performing the monitoring tasks is finished. The set of tasks to be monitored can be adjusted or changed by the management server from time to time.

The management system can use the ongoing performance measurements to perform various management functions. For example, the management system can use the series of performance measures to determine a baseline range of performance for a server. The management system can also compare current or recent performance measures to this baseline and detect deviations in run-time performance. When response times deviate from typical levels for at least a threshold amount or over at least a threshold amount of time, the management system can automatically take an action, such as notifying an administrator. The management system can additionally or alternatively take corrective action to a performance decrease, such as instructing a change to settings of the server being monitored, allocating additional hardware resources to the server, starting another instance of a server environment to better manage traffic, and so on.

In general, the management system can evaluate whether performance measures obtained through the ongoing monitoring satisfy certain conditions. The management server can then perform one or more actions that have been specified to correspond to the satisfied conditions. For example, the management server may assess a series of multiple performance measures representing performance data points measured over a time period. The management server can detect values, trends, or patterns that are indicative of certain operating conditions, such as excessive load or decrease in performance experienced by users.

Because each cycle of performance measurement involves multiple different tasks, the management system can detect performance problems of different types. For example, if the loading of ten different documents is monitored and a performance measurement cycle shows most or all exhibiting a loading time that is longer than typical, then the management server can determine that performance is decreasing generally for the server. By contrast, if only a specific document shows decreased performance, the management server may determine that a problem exists for the specific document and potentially the component elements or data sources the document relies on. This can help narrow down the causes of performance decreases and also select corrective actions to improve performance. Similarly, some operations may be more sensitive to memory availability while other tasks are more affected by CPU availability, and by detecting the differences as the performance levels of each, the management system can identify which aspect is under greatest constraint.

In one general aspect, a method includes: identifying, by the one or more computers, a resource provided by a server system; generating, by the one or more computers, a performance test for the server system, the performance test comprising a series of operations that includes (i) providing the resource and (ii) responding to one or more interactions with the resource; performing one or more performance testing cycles that each include: causing the server system to perform the series of operations of the performance test; and evaluating one or more performance measures that characterize the performance of the series of operations by the server system.

In some implementations, the resource is a first resource and the performance test is a first performance test; and the method includes generating one or more other performance tests each involving a respective resource that is different from the first resource, the one or more other performance tests each comprising a respective series of operations that includes (i) providing the respective resource and (ii) responding to one or more interactions with the respective resource. Performing the one or more performance testing cycles includes performing, in each of the performance testing cycles, the first performance test and each of the one or more other performance tests.

In some implementations, performing the one or more performance testing cycles includes performing multiple performance testing cycles repeated at an interval.

In some implementations, the one or more interactions comprise one or more simulated user interactions with the resource.

In some implementations, the resource is a document, and the one or more simulated user interactions comprise an interaction by at least one of navigating to a particular portion of the document, scrolling, editing, annotating, saving, filtering, selecting, highlighting, printing, copying, zooming, clicking, or dragging.

In some implementations, the one or more simulated user interactions includes a sequence of multiple simulated user interactions.

In some implementations, the method includes, in each of the one or more performance testing cycles, determining one or more performance measures for the series of operations of the performance test, the one or more performance measures being based on: a duration of time to complete the series of operations; a duration of time to complete one or more individual operations in the series of operations; an amount or type of errors occurring during the series of operations; or an accuracy of a result of performing the series of operations.

In some implementations, the method includes receiving data indicating a series of user interactions with the resource that a user designated to be included in the performance test; and the performance test is generated to include responding to the series of user interactions with the resource.

In some implementations, generating the performance test includes: accessing user activity data indicating multiple sequences of user interactions with the resource over a period of time; selecting a subset of the user interactions with the resource based on an amount of times the respective user interactions with the resource occur in the multiple sequences of user interactions; and including, in the series of operations of the performance test, responding to the interactions in the selected subset.

In some implementations, the method includes: receiving activity data indicating user interactions with multiple resources provided by the server system; evaluating the activity data to identify resources that satisfy one or more criteria; and providing, to a user device for presentation, a recommendation of one or more identified resources to be tested during the one or more performance testing cycles.

In some implementations, the method includes: receiving activity data indicating user interactions with the resource; evaluating the activity data to identify a sequence of multiple user interactions that was performed at least a threshold number of times; and providing, to a user device for presentation, a recommendation of the sequence of multiple user interactions to be tested in the performance test.

In some implementations, the performance test includes operations that simulate loading of a specific document, presenting a specific portion of the specific document, and activating one or more interactive user interface controls available for the specific portion of the specific document.

In some implementations, the method includes based on the evaluation of the one or more performance measures, adjusting one or more operating parameters of the server system.

In some implementations, the method includes based on the evaluation of the one or more performance measures, providing a notification regarding the operation of the server system.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 2A-2B are diagrams that illustrates example interfaces displaying performance data.

Like reference numbers and designations in the various drawings indicate like elements.

DETAILED DESCRIPTION

Figure 1:
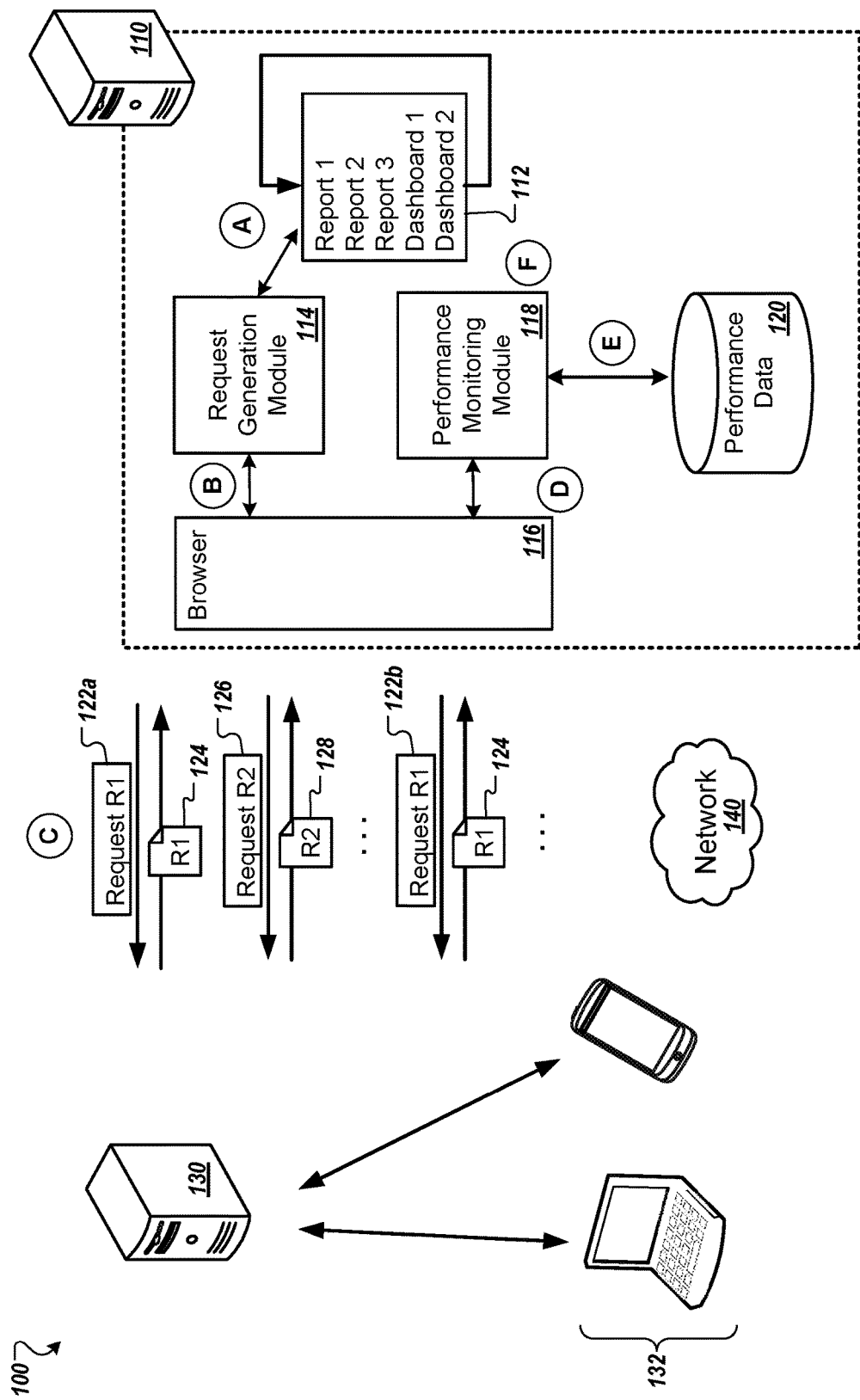
FIG. 1 is a diagram that illustrates an example system for monitoring performance of computing systems.

FIG. 1 is a diagram that illustrates an example system 100 for monitoring performance of computer systems. The system 100 includes a management system 110 that performs performance monitoring, a server system 130 to be monitored, client devices 132, and a network 140.

The system 100 can be used to monitor the end-to-end performance and reliability that would be experienced by a user interacting with the server system 130. The management system 110 can automatically and precisely measure the end-to-end response time to perform one or more tasks, such as loading a document provided by a server, by simulating a user initiating the tasks. The management system 110 may monitor the response time on a continual or ongoing basis by repeatedly performing the specified tasks. The management system 110, by repeatedly testing the server system 130 at regular intervals, can establish a detailed view of the performance of the server system 130 over time. This enables the management system 110 to detect and react to performance changes and performance trends for the monitored server system 130, as well as to establish the nature of normal performance patterns of the server system 130.

The management system 110 may organize and display monitored end-user-experience performance data. The management system 110 may analyze the end-user-experience performance data to provide a historical breakdown of the monitored end-user-experience performance. Based on the analysis, the management system 110 may perform one or more actions, such as notifying an administrator of performance changes, adjusting settings to improve performance, changing an assignment of users from one system to another, adjusting an allocation of hardware resources, and so on.

FIG. 1 also illustrates various events, shown as stages (A) to (E), with each representing a step in an example process. Stages (A) to (E) may occur in the illustrated sequence, or in a sequence that is different from the illustrated sequence. For example, some of the stages may occur concurrently.

The management system 110 is configured to monitor the performance of one or more different systems. In the example of FIG. 1, the management system 110 monitors the performance of the server system 130 and can communicate with the server system 130 over the network 140. The management system 110 may include one or more computing devices. The management system 110 has a task list 112 that includes a set of tasks to be tested on the server system 130. The management system also includes a request generation module 114 that creates requests that are sent by a headless browser 116 to the server system 130. After the requests are sent, a performance monitoring module 118 evaluates the performance of the server system 130 for different requests and stores performance data in data storage 120.

The server system 130 can include one or more computing devices. The server system 130 can communicate with the client devices 132 over the network 140, in addition to the management system 110. The server system 130 may be an onsite server, an offsite server, or an environment hosted by a cloud computing platform (e.g., Amazon Web Services (AWS), Microsoft Azure, etc.). The server system 130 may be provided, owned, and/or operated by a third-party with respect to the management system 110.

The client devices 132 may be computing devices, such as a desktop computer, a laptop computer, a cell phone, a smart phone, and/or a tablet device.

The network 140 can include public and/or private networks and can include the Internet.

In the example of FIG. 1, the management system 110 initiates tasks to be performed by the server system 130, which represents a server environment that is in use and responding to requests by various other users, e.g., an "in production" system. By performing tasks on a production environment and by treating those tasks the same as if they were initiated by a user, the disclosed system is able to recreate the actual end-user experience. The disclosed system can monitor the resulting performance data to obtain accurate end-user-experience performance for particular tasks. Additionally, this performance data may be used by an administrator or by the system itself to modify server configuration settings in order to improve performance.

By monitoring performance as discussed below, the management system 110 can quickly identify errors or performance decreases that affect end users of the server system 130. In some implementations, the management system 110 tests each task in the task list 112 sequentially. After all the items in the task list have been tested, the management system 110 repeats the testing of all the items in the task list 112. By repeating the testing of the items so that performance is tested continually, the management system 110 is able to quickly identify deviations from the server system's 130 typical performance. Among other features, the management system 110 can determine when performance decreases occurred, the magnitude or extent that performance has decreased, and the duration that performance decreases last. In addition to the performance data, the management system 110 can obtain telemetry data about the functioning of the server system 130 (e.g., which software modules are running, which hardware resources are allocated, load levels experienced, current settings, etc.), and use the performance data and the telemetry data to identify and fix the causes of performance decreases.

As shown in FIG. 1, at stage (A), the management system 110 obtains a task list 112 that specifies the set of tasks to be tested for the server system 130. As shown, the task list 112 in this example includes the retrieval or generation of specific reports and dashboards. The task list 112 can be generated by the management system 110 and/or a system administrator. In some implementations, a separate task list is determined for each computer system to be monitored. The task list can be representative of the usual workload of the monitored computer system. For example, the task list 112 can be a variety of tasks that represent the most commonly served documents or other most commonly performed functions of the server system 130.

When an administrator generates at least part of the task list 112, the management system 110 can provide a list of tasks that can be performed by the server system 130 and/or associated items, such as documents provided by the server system 130. Examples of tasks include accessing an item, logging in a user, retrieving an item or part of an item, loading an item, rendering an item, filtering an item, scrolling through an item to a particular location, etc. As an example, an administrator's client device may provide a user interface that shows a list documents or other items stored on the server system 130. The items may include, for example, reports, dashboards, documents, websites, etc. In this example, when the administrator selects an item, they may be presented a drop-down menu of available tasks that can be performed with the item. An administrator may then select one or more tasks or operations to be performed with the item. If multiple tasks are selected to be performed with the item, then a workflow specifying the multiple tasks may be created, and the workflow can be added to the task list 112.

In some implementations, the task list 112 is generated in part or entirely by the management system 110. For example, the management system 110 may access usage logs that indicate the tasks that users have initiated over a period of time (e.g., the previous day, week, month, etc.). The management system 110 may then select the tasks most frequently performed by users to the task list 112 and/or select the items that users most frequently interact with. For example, the management system 110 may identify the most frequently accessed resources in different categories (e.g., reports, data cubes, dashboards, etc.). The management system 110 can then select a predetermined number (e.g., 3, 5, 10, etc.) of the most frequently accessed resources in each category, and add the generation of or other access to the selected resources as tasks in the task list 112. Over time, as the usage patterns for the server system 130 change, the management system 110 can also change the set of tasks in the task list 112 to reflect the new usage patterns, e.g., by adding newly popular tasks and removing tasks that have become less popular.

Even when the management system 110 selects some or all of the tasks for the task list 112, a system administrator may modify the tasks or edit the task list 112. An administrator may modify a task list (e.g., the task list 112) generated by the management system 110, for example, by adding available tasks and/or items to the list or removing tasks and/or items from the list.

In some implementations, a task can specify an action regarding a part or subset of an item, such as a location within a document. For example, an administrator may specify that a task involves retrieving only the first three pages of a particular document, rather than retrieving the entire document. Similarly, the management system 110 may also define tasks that represent specific interactions or portions of items, for example, to test performance for a specific part of an item that is frequently accessed.

The items in the task list 112 are arranged in a particular order, which indicates the order in which the tasks are to be tested. The management system 110 may select the order of the tasks in the task list 112. An administrator may select the order of the tasks in the task list 112 or may modify an order selected by the monitoring system 100. Here, the task list 112 includes the generation of the first report 124 ("Report 1"), the second report 128 ("Report 2"), the third report ("Report 3"), the first dashboard ("Dashboard 1"), and the second dashboard ("Dashboard 2"), in the recited order.

In general, the tasks in the task list 112 can be set to be performed sequentially. For example, the management system 110 initiates testing for the first task and waits to initiate the second task until the first task is completed. This can help limit the impact of performance monitoring on other concurrently running tasks, and can improve the reliability of testing. In some implementations, one or more tasks in the task list 112 are designated to be tested concurrently instead of sequentially. Concurrent testing of two or more tasks may have been specified during generation of or editing of the task list 112. For example, an administrator may select two reports and indicate that they should be tested concurrently. In this example, an administrator may select these two reports for concurrent testing or the management system 110 may suggest these two reports to the administrator for concurrent testing if it is known that users frequently use these reports together or contemporaneously with one another.

At stage (B), the management system 110 launches an application, such as the browser 116, and the request generation module 114 generates requests for the application to send to the server system 130. The application can be a web browser or other application that communicates with a server system. The browser 116 may be a headless browser, for example, a browser that does not have any corresponding display. The browser 116 receives requests generated by the request generation module 114 and sends the requests to the server system 130. In some implementations, the request generation module 114 sends the generated requests to the browser 116 sequentially in the order specified in the task list 112.

In the example of FIG. 1, the browser 116 is used to send requests to and receive responses from the server system 130, in a manner that the requests are perceived to be user traffic by the server system 130. The management system 110 can concurrently run various other browser instances to communicate with other server systems being monitored by the management system 110. Similarly, the request generation module 114 can generate requests for multiple server environments, based on the same or different task lists.

The request generation module 114 accesses the task list 112 and generates a request for each of the tasks in the task list 112. Accordingly, the request generation module 114 generates the first request 122a for the first report 124 ("Report 1"), the second request 126 for the second report 128 ("Report 2"), the third request for the third report ("Report 3"), the fourth request for the first dashboard ("Dashboard 1"), and the fifth request for the second dashboard ("Dashboard 2").

In some implementations, when the request generation module 114 has finished generating requests for each of the tasks in the task list 112, it will repeat the process, starting with generating the new request 122b for the first report 124. Alternatively, the request generation module 114 may reuse the previously generated requests (e.g., request 122a is the same as request 122b).

The request generation module 114 generates the requests in such a way so as to simulate a request made by a typical user. Accordingly, the requests created by the request generation module 114 may be absent of any special permissions or authorizations, may use a standard pathway (e.g., the same server sockets that users typically use), may be placed in a standard queue, etc. As an example, the generated requests may appear the same or similar to requests originating with the client devices 132.

The generated requests may contain an indication of the task to be performed and/or an indication of any associated items. For example, the generated requests may include an address of an item's location on the server system 130, such as a URL for the item. For example, the generated requests may include the name or other identifier of an item associated with a task (e.g., Report 1). For example, the generated requests may include an identifier for a location within an item associated with a task such as a page number (e.g., page 2 of Report 1). For example, the generated requests may include credentials for particular tasks such as logging in. For example, the generated requests may include a name or other identifier for the task to be performed (e.g., access, load, retrieve, generate, etc.).

At stage (C), the browser 116 sends the generated requests to the server system 130 over the network 140 and receives responses from the server system 130 over the network 140. Here, the management server 110 sends the first request 122a for the first report 124 ("Report 1"), the second request 126 for the second report 128 ("Report 2"), the third request for the third report ("Report 3), the fourth request for the first dashboard ("Dashboard 1"), and the fifth request for the second dashboard ("Dashboard 2") to the server system 130. The browser 116 sends the requests, including the requests 122a and 126, in a manner instructed by the request generation module 114, which can be sequentially in the order specified in the task list 112. The browser 116 may send one or more of the requests concurrently.

After the management server 110 sends a request to the server system 130, the management server 110 receives a response from the server system 130. Here, the management server 110 receives the first report 124 as a response to the request 122a, and receives the second report 128 as a response to the request 126.

The management system 110 records a time at which each of the requests is sent and a time at which each of the corresponding responses is received. In some implementations, the browser 116 waits to receive a response (e.g., fulfillment of a request) before sending the next request. For example, the browser 116 may wait to receive the report 124 requested by request 122a before sending the request 126. This can facilitate the performance of sequences of operations involving the same resources. For example, one task may retrieve a document, the next task may perform an operation on a part of the document, the next task may save a copy of the document, and so on. Performing the tasks in sequence can ensure that the appropriate data or state is available when each task is initiated, and the process can appropriately simulate typical user behavior.

In some implementations, for example when running independent tasks, the browser 116 does not wait to receive a response to a request before sending the next request. For example, the browser 116 may send the request 126 before receiving the report 124.

In some implementations, the browser 116 sends one or more requests concurrently. For example, the browser 116 may send the requests 122a and 126 at the same time or approximately the same time.

After the management system 110 has finished sending a request for each of the tasks in the task list 112 (and, in some implementations), has received each of the corresponding responses), the management system 110 repeats the process. As shown, after sending requests for each task in the task list 112, the browser 116 sends the new request 122b to obtain the report 124 again. The management system 110 causes the browser 116 to then continue cycling through the tasks in the task list 112, recording the performance of the server system's 130 execution of the tasks each time.

Where the response includes an item such as a document, the browser 116 may perform additional actions on the item based on the corresponding task. For example, the browser 116 may load or render the reports 124 and 128 that are received from the server system 130. The browser 116 may perform the steps of a workflow with the retrieved item. The steps of the workflow may be based on steps that are typically performed by users with the particular retrieved item. For example, the browser 116 may open the report 124, scroll to page 2 of the report, and filter the report by geography. This sequence of actions may be derived from usage logs that indicate, for example, that 60% of users perform these steps with the report 124. The management system 110 may record the time it takes to perform each of these additional actions. The management system 110 may determine these times using the browser 116. For example, in addition to recording the time at which request 122a was sent and the time at which the report 124 was received, the browser 116 may render the report 124 and record the time at which the report 124 rendering was completed.

At stage (D), the management system 110 provides the recorded times to the performance monitoring module 118. The performance monitoring module 118 may use the recorded times to calculate current performance metrics. These current performance metrics may include a response time, a task completion time (which may, in some instances, be equivalent to the response time), an individual action time (e.g., time to load an item or part of an item, time to render an item or part of an item, time to scroll through an item, time to filter an item, etc.).

The performance monitoring module 118 may compare the time at which the request 122a was sent from browser 116 with the time at which report 124 was received by the browser 116 in order to calculate a first response time for request 122a. The performance monitoring module 118 may compare the time at which the request 122a was sent from the browser 116 with the time at which the report 124 was rendered in order to calculate a first task completion time for the report 124. The performance monitoring module 118 may compare the time at which the report 124 was received by the browser 116 with the time at which the report 124 was rendered in order to calculate a first rendering time for the report 124.

The performance monitoring module may analyze the calculated performance metrics. The performance monitoring module 118 may issue an error or a warning based on one or more of the performance metrics. An error or warning may occur if a performance metric is unusually high, unusually low, or cannot be calculated.

The performance metrics determined by the management system 110 can be used to establish a baseline level of performance for the server system 130, which can be expressed as thresholds that represent average response time, maximum response time, and so on. The management system 110 can determine that performance deviation has occurred when a metric does not satisfy one of the thresholds representing typical performance. These thresholds can be predetermined or variable. In general, the performance monitoring module 118 may determine thresholds for different performance metrics as an average of that performance metric over multiple cycles of testing, e.g., multiple iterations of the tasks in the task list 112. The threshold can be based on a moving average that covers results from a most recently time period.

For example, the performance monitoring module 118 calculates a 2-day average task completion time for generating the report 124. The performance monitoring module 118 may use a timestamp for sending the request 122a and a timestamp for receiving the report 124 to determine a task completion time. The performance monitoring module 118 may then compare the current completion time with the average completion time to determine whether the difference exceeds some magnitude, such as taking at least 25% longer than the average. When the result is determined to take at least 25% longer than average, the performance monitoring module may issue a warning. Various warnings and other actions can be taken for different levels of performance deviations. For example, if the result is 200% slower than the average, a higher priority notification may be issued, or a corrective action may be initiated.

In addition, performance thresholds can be selected by an administrator. For example, an administrator may specify that if a response time is greater than 5 seconds for any report, then the administrator should be notified.

An unusually low performance metric is associated with a time that is shorter than expected. A short time may indicate that a task was not fully performed. The performance monitoring module 118 may determine that a performance metric is unusually high if it is above a threshold (e.g., a predetermined or variable threshold) as, for example, selected by an administrator.

If a performance metric cannot be calculated, this may indicate that there was a failure in performing the task. For example, a performance metric might not be calculated if an item was unable to be rendered, an item was never received from the server system 130, an invalid response was received from the server system 130, etc.

If an error or warning is determined, the management system 110 may perform one or more actions. For example, the management system 110 may generate and send a notification or other alert to a system administrator. The notification may include an indication of performance changes that have been detected by the management system 110 and which have resulted in the error or warning. As another example, the management system 110 may adjust server configuration settings of a particular server system to improve the performance of that server system. Adjusting server configuration settings may include, for example, modifying the network bandwidth of the server system 130, the latency of the server system 130, the cache size of the server system 130, the working data amount for operations performed by the server system 130, and/or the version of software used by the server system 130. As another example, the management system 110 may adjust an allocation of hardware resources for a particular server system to improve the performance of that server system. Adjusting the allocation of hardware resources may include, for example, modifying the number of CPUs allocated to the server system 130, and/or the amount of memory (e.g., RAM) allocated to the server system 130. As another example, the management system 110 may change an assignment of users from one server system, such as the server system 130, to one or more different server systems. By reducing the number of users on one server system, such as the server system 130, the management system 110 can improve the performance of that server system.

At stage (E), the performance monitoring module 118 stores the calculated performance metrics in the data storage 120. There may be stored performance metrics for a task list (e.g., the task list 112), for an individual task (e.g., the report 124), and/or for a component of a task (e.g., individual pages of documents or reports, individual elements of pages, etc.). There may be multiple stored performance metrics for each task list, for each task, and/or for each component of a task. For example, the data storage 120 may contain five performance metrics for rendering page three of the report 124. In this example, the five performance metrics may be rendering times for the five most recent renderings of page three of the report 124. The stored performance metrics may be tagged with a time and date. The performance metrics may be organized in the data storage 120 by the order in which the task list, the tasks, and/or the components of a task were performed. For example, the performance metrics of the task list 112, of the individual tasks within the task list 112, and/or the components of the tasks within the task list 112 may be stored in the data storage 120 in the task order of the task list 112.

At stage (F), the performance monitoring module 118 accesses the data storage 120 to obtain previously calculated performance metrics for a particular task and/or item and analyzes the previously calculated performance metrics. Based on the analysis, the performance monitoring module 118 may calculate historical performance metrics for the particular task and/or item. Historical performance metrics may include, for example, average response time over a specified period (e.g., 1 hour, 12 hours, 1 day, 2 days, 1 week, 10 days, 2 weeks, 20 days, 1 month, etc.), an average task completion time for a particular task and/or item over a specified period, an average action time for a particular item over a specified period, an average success rate (e.g., the rate at which performing a task with a particular item does not result in an error and/or a warning), a maximum rate (e.g., the longest amount of time it has taken to perform a task with a particular item), a number of times a task has been performed or performed with a particular item (e.g., the number of times a particular item has been generated for monitoring purposes), a total number of warnings associated with a particular task and/or item, a total number of errors associated with a particular task and/or item, etc.

The performance monitoring module 118 may issue an error or a warning based on one or more of the historical performance metrics. An error or warning may occur if a historical performance metric is unusually high or unusually low with respect to thresholds representing desired levels, or if the performance metric cannot be calculated. Determining that a historical performance metric is unusually high or low may involve comparing the historical performance metric with one or more thresholds. For example, there may be a high error threshold, a high warning threshold lower than the high error threshold, a low error threshold, and a low warning threshold higher than the low error threshold. The performance monitoring module 118 may store the calculated historical performance metrics in the data storage 120 as part of the performance data.

The management system 110 may determine a relative performance measure, such as a relative performance index (RPI), for the configuration settings of the server system 130. The RPI value indicates the level of performance when a particular combination of configuration settings is used, after the influence of the hardware resources and/or the load levels of a particular server environment have been removed or reduced.

In order to remove the influences and determine the RPI, the management system 110 may normalize the performance results (e.g., the performance metrics calculated by the performance monitoring module 118 and/or the performance metrics stored in the data storage 120) for the hardware resources used by the server system 130 during the testing process, and/or normalize the load levels on the server system 130 during the testing process. In order to normalize the performance results and/or the load levels, the management system 110 may first obtain telemetry data about the functioning of the server system 130. The telemetry data may include an indication of which software modules are running on the server system 130, which hardware resources are allocated to the server system 130, load levels experienced by the server system 130 (e.g., total load including the traffic from the client devices), the current server configuration settings for the server system 130, etc.

Normalizing the performance results may involve scaling the performance results based on differences in load level and/or differences in hardware resources as indicated by the obtained telemetry data of the server system 130. This process can boost or penalize performance metrics to estimate how the server system 130 would have performed if it had the same hardware resources available and experienced the same load levels as one or more other server systems, or as a standard or model server system. As a very simple example, the performance metrics could be normalized to the equivalent of a 50% load level. For a task that scales linearly with load capacity, the scaling factor could be $1+(50-X)/100$, where "X" represents the load level percentage. As a result, if the server system 130 had a load level of 80% at the time of testing, a 1.0 second task completion time may be scaled from 1.0 seconds to $1.0*(1-30/100)=0.7$ seconds. Similarly, a different server system that had a load level of 30% at the time of testing and also achieved a 1.0 second task completion time may be scaled from 1.0 seconds to $1.0*(1+20/100)=1.2$ seconds. Differing hardware capabilities can also be taken into account with scaling factors. The scaling used during the normalization of the performance metrics may be linear or non-linear. In some implementations, the scaling or the RPI score itself is determined by a machine-learning model that has learned from examples, previous performance results, and/or previous configuration settings.

In some implementations, the RPI is determined for overall performance. That is, the RPI might account for each type of performance metric. For example, the RPI might account for the response time(s), the task completion time (s), the concurrency, the frequency of errors, the type of errors, and the accuracy of results. However, each of these performance aspects are not necessarily weighted the same when determining the RPI. In some implementations, multiple RPI scores may be calculated for different types of performance metrics, e.g., with one RPI score being a normalized indication of response time, another RPI score representing a normalized indication of accuracy, etc.

In actual implementations, the techniques for normalizing the performance metrics and generating RPI values can be defined or learned empirically. Different tasks or portions of tasks are sensitive to different factors, e.g., memory size, memory latency, CPU speed, number of concurrent tasks, and so on, and there may be non-linear or unpredictable relationships of these factors on performance. The management system 110 can run the tasks used for testing in different, controlled conditions to characterize the effects of different hardware changes and load levels on performance. This can enable the management system 110 to characterize how different conditions affect performance. In other words, the management server 110 can operate a server environment and with the same software configuration settings, run a suite of tests with the environment experiencing 0% load, then 5% load, then 10% load, then 15% load and so on. Similarly, the management system 110 can operate a server environment with the same software configuration settings and different hardware resources, e.g., different numbers of processors, different types of processors, different memory sizes, and so on. By testing different combinations of load levels and hardware resources while keeping software settings and other factors constant, the management system 110 can isolate the effects of (and interplay of) load level and hardware resources, to develop the data points that show how change in load and hardware affect performance. Of course, the characterization of effects of load and hardware on performance can be done for each of various different combinations of configuration settings, so that the particularities of one combination of configuration settings do not skew the relationships that will be used for normalizing results. With the load/hardware characterization data points, the management system 110 can extract the relationships needed to normalize for changes in load and hardware. This can be done thorough any appropriate technique, such as regression modelling, curve fitting, or machine learning.

As an example, the management system 110 can use the data points that characterize the performance of a single software configuration over different load and hardware conditions to train machine learning models. For example, a machine learning model can be trained to receive input indicating actual performance measured for a test, load statistics during the test, and hardware used by the tested environment, and output an RPI. The parameters of the machine learning model can be trained so that substantially the same RPI is produced for a single test and software configuration, even for different absolute performance results achieved due to different load and hardware conditions. By training models in this way, the models can learn the complex interaction between different types of tasks with load levels and hardware resource availability, and perform a normalization that takes them into account.

In some implementations, the requests 122a, 126, and 122b may be sent by a mobile computing device. For example, the requests 122a, 126, and 122b may be sent by a smart phone, a tablet computer, a laptop computer, etc. The mobile computing device may be a mobile computing device of an administrator of the management system 110. The mobile computing device may be a mobile computing device of a user of the management system 110. The mobile computing device may be able to communicate with the management system 110. As an example, the mobile computing device may receive the task list 112 from the management system 110. The mobile computing device may generate requests for each of the tasks within the task list 112. The mobile computing device may then send each of the generated requests to the server system 130. The mobile computing device may send a sent time for each of the requests 122a, 126, and 122b to the management system 110.

In some implementations, responses from the server system 130 may be received by a mobile computing device. For example, the first report 124 and the second report 128 may be received by a smart phone, a tablet computer, a laptop computer, etc. The mobile computing device may be a mobile computing device of an administrator of the management system 110. The mobile computing device may be a mobile computing device of a user of the management system 110. The mobile computing device may be able to communicate with the management system 110. In these implementations, the mobile computing device may have sent the requests 122*a*, 126, and 122*b* to the server system 130. As an example, the mobile computing device may receive the first report 124 and the second report 128 from the server system 130. The mobile computing device may then record various times associated with the first report 124 and the second report 128, e.g., a time when each report was received, a time when each report was rendered, etc. The mobile computing device may then send these times to the management system 110 or may calculate performance metrics associated with the first report 124 and/or the second report 128 itself, e.g., where the mobile computing device sent the requests 122*a*, 126, and/or 122*b* to the server system 130.

FIGS. 2A-2B are diagrams that illustrates example interfaces displaying performance data.

As shown in FIG. 2A, an interface 200*a* displays performance data. The performance data may be organized by date such that there is a window for each day or other specified time period (e.g., 12 hours, 2 days, 1 week, 10 days, 20 days, 1 month, etc.). Here, a window 202, for the date of Mar. 11, 2019, includes a list of various tasks 204, a list of monitored request times 206 for each of the tasks, a list of monitored response times 208 for each of the tasks, a list of rendering times 210 for each of the tasks, and a list of total times 212 for each of the tasks (i.e., amount of time needed to perform the task). The total times 212 may represent a current performance metrics as calculated, for example, by the performance monitoring module 118 of the management system 110 as shown in FIG. 1. The values included in the list of the total times 212 may be in seconds.

The tasks 204 include the same tasks in the task list 112 as shown in FIG. 1. Here, the name of each of the items (e.g., "Report 1") in the tasks 204 is associated with the task of generating that item.

Here, as indicated by the request times 206 and the rendered times 210, a request for a following task of the tasks 204 is not sent until the previous task of the tasks 204 is complete (e.g., until the associated item has been rendered). The request for the following task of the tasks 204 may be sent immediately following the completion of the previous task of tasks 204.

As discussed with reference to FIG. 1, the set of tasks may be repeatedly performed in a continual or repetitive manner. Accordingly, after the last task of a set is performed (e.g., the last task of the task list 112 as shown in FIG. 1), the first task of the set is performed again. For these reasons, Report 1 appears a second time in the tasks 204 immediately following the rendering of Dashboard 1.

As shown, despite Report 1 being generated twice in a short span of time, two different response times, found in the total times 212, are monitored. The first time of 1.32 is slower than the second time of 1.21, indicating an improvement in task performance.

Further scrolling through the window 202 may reveal additional performance data for the various tasks. The additional performance data may reveal additional request times of the request times 206, additional response times of the response times 208, additional rendering times of the rendering times 210, and additional total times of the total times 212 for generating the Report 1, the Report 2, the Report 3, the Dashboard 1, and the Dashboard 2. The additional performance data may reveal that repeated generation of the Report 1, the Report 2, the Report 3, the Dashboard 1, and the Dashboard 2 consistently and constantly throughout Mar. 11, 2019 in the stated order.

As shown in FIG. 2B, an interface 200*b* displays historical performance data. The interface 200*b* includes a window 220 containing a list of items 222, a list of tasks 224 performed with the items 222, a list of time values 226 representing averages over the past two days, a list of time values 228 representing averages over the past twenty days, and a list of percentages 230 representing the percent change between the time values 228 and the time values 226. The time values 226 and 228 may represent values in seconds. A positive percentage of the percentages 230 is associated with an improvement in task performance, whereas a negative percentage of the percentages 230 is associated with a decline in task performance.

Although the time values 226 represent averages over the past two days, other time ranges may be selected and displayed. For example, a time range of the past six hours, the past 12 hours, the past day, the past three days, or the past week may be selected and displayed in the window 220.

Although the time values 228 represent averages over the past 20 days, other time ranges may be selected and displayed. For example, a time range of the past week, the past 10 days, the past 14 days, the past month or 30 days, the past six months, or the past year may be selected and displayed in the window 220.

The items found in the items list 222 include Report 1 and Report 2. Further scrolling through the window 220 may reveal additional items. These additional items may include the other reports and the dashboards found in the task list 112 as shown in FIG. 1.

The task list 224 includes the tasks of generating an item, and generating and applying a filter to an item. Further scrolling through the window 220 may reveal additional tasks. These additional tasks may include, for example, accessing an item, logging into one or more systems, retrieving an item, loading an item or part of an item, rendering an item or part of an item, scrolling through an item, etc.

Figure 3:
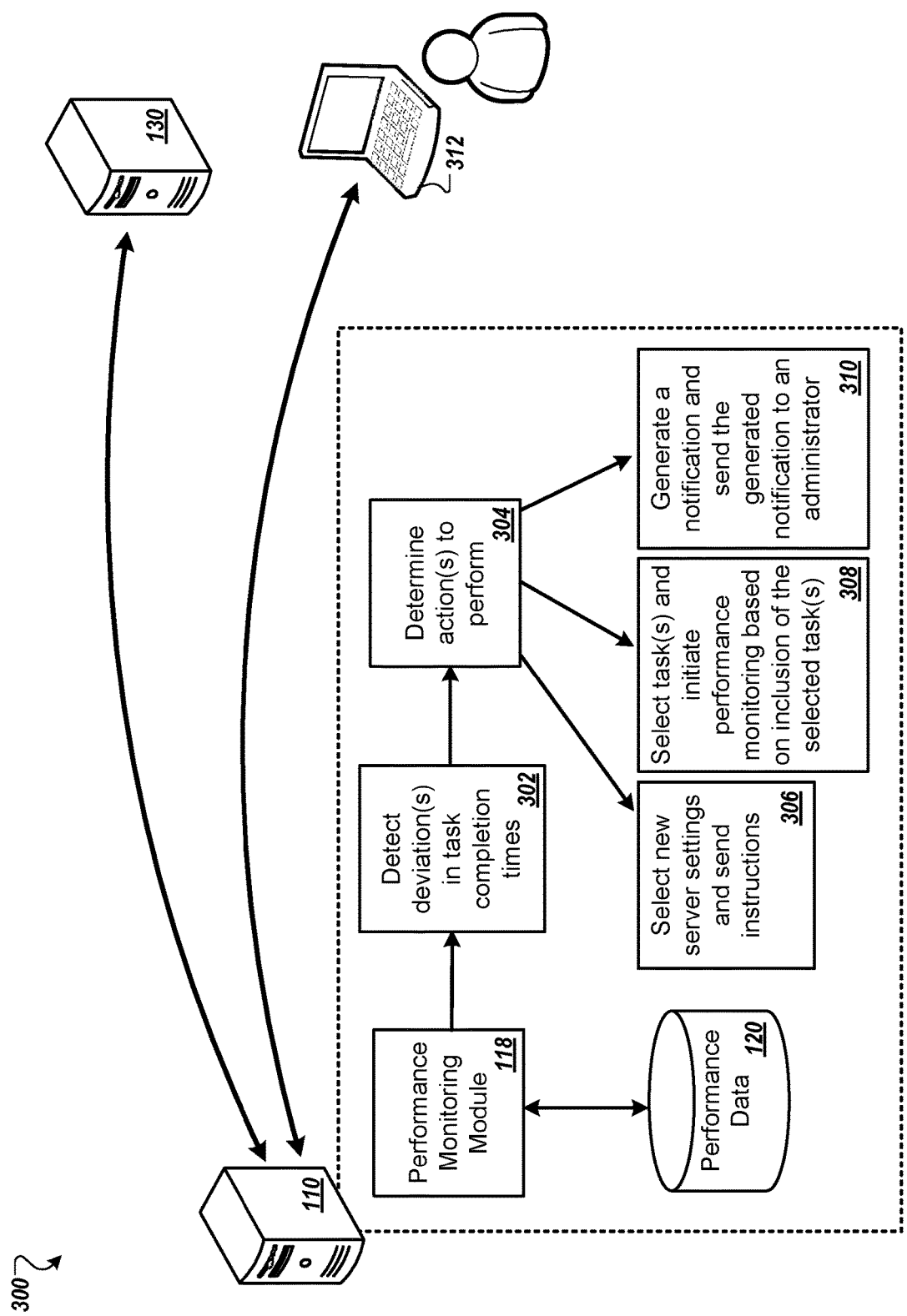
FIG. 3 is a diagram that illustrates an example system for performing actions based on monitored performance.

FIG. 3 is a diagram that illustrate a system 300 for performing actions based on monitored performance. The system 300 includes the management system 110, the server system 130, and an administrator device 312. The management system 110 includes the performance monitoring module 118 and the data storage 120 containing performance data.

While analyzing current performance data or analyzing historical performance data, the performance monitoring module 118 may detect a deviation in task completion times (302). This deviation may be associated with a warning or an error as discussed above with reference to FIG. 1. If a warning or an error is determined to be associated with the detected deviation, the performance monitoring module 118 may store the warning or the error as part of the performance data in data storage 120.

Based on the detected deviation, the management system 110 determines one or more actions to perform (304). These actions may include, for example, notifying an administrator of performance changes, adjusting settings to improve performance, changing an assignment of users from one system to another, adjusting an allocation of hardware resources, and so on. The administrator may be an administrator of the server system 130. Determining the one or more actions to perform may be based on whether the deviation is associated with a warning or with an error. For example, if the performance data meets a first threshold but does not meet a second threshold, the management system 110 shown in FIG. 1 may determine that the deviation should be classified as a warning and may send a corresponding notification to an administrator. As another example, if the performance data meets both a first threshold and a second threshold, the management system 110 may determine that the deviation should be classified as an error and may send a higher priority notification to the administrator and may perform additional actions such as adjusting the configuration settings of the server system 130 shown in FIG. 1. The thresholds may be based on a baseline level of performance established by the management system 110 for the server system 130. For example, the first threshold may be 50% above the baseline and the second threshold may be 200% above the baseline. The thresholds may be automatically calculated using the established baseline. The thresholds may be set by a system administrator. The thresholds may be set by a machine learning network.

The management system 110 may determine to select new server configuration settings and send instructions to the server system 130 (306). This action may be selected by the management system 110 where deviations in task completion times indicate poor performance but not necessarily an error. For example, if it is determined that the generation of reports on the server system 130 takes on average 20% longer than recommended, the management system 110 may select new configuration settings for the server system 130 such that 20% more RAM is allocated to such tasks. Poor performance or performance that is worse than expected may be associated with a warning. The configuration settings may include one or more of a network bandwidth, a latency, a cache size, a number of CPUs allocated, a working data amount for operations performed, an amount of memory (e.g., RAM), and/or a version of software used. Upon determining new configuration settings for the server system 130, the management system 110 either sends them to the server system 130 to be immediately applied or sends them to the administrator device 312 for verification.

The management system 110 may determine to select one or more tasks and initiate performance monitoring based on inclusion of the selected tasks (308). This action may be selected by the management system 110 where deviations in task completion times indicate a warning or an error. The selected one or more tasks may be those tasks that have been previously associated with a warning or an error. The selected one or more tasks may be those tasks that have been most frequently associated with a warning or an error. The selected one or more tasks may be associated with one or more particular items, such as reports, other documents, dashboards, etc. The management system 110 may initiate performance of the selected one or more tasks by generating a request (e.g., by the request generation module 114 as shown in FIG. 1) and sending the generated request to the server system 130.

The management system 110 may generate a notification and send the generated notification to an administrator (310). The notification may be generated by the performance monitoring module 118. The notification may include the name or other identifier of the task associated with the detected deviation. The notification may include the name or other identifier of an item associated with the task that is associated with the detected deviation. The notification may include an indication of whether a warning or an error was associated with the detected deviation. In sending the generated notification to an administrator, the management system 110 sends the generated notification to the administrator device 312.

Figure 4:
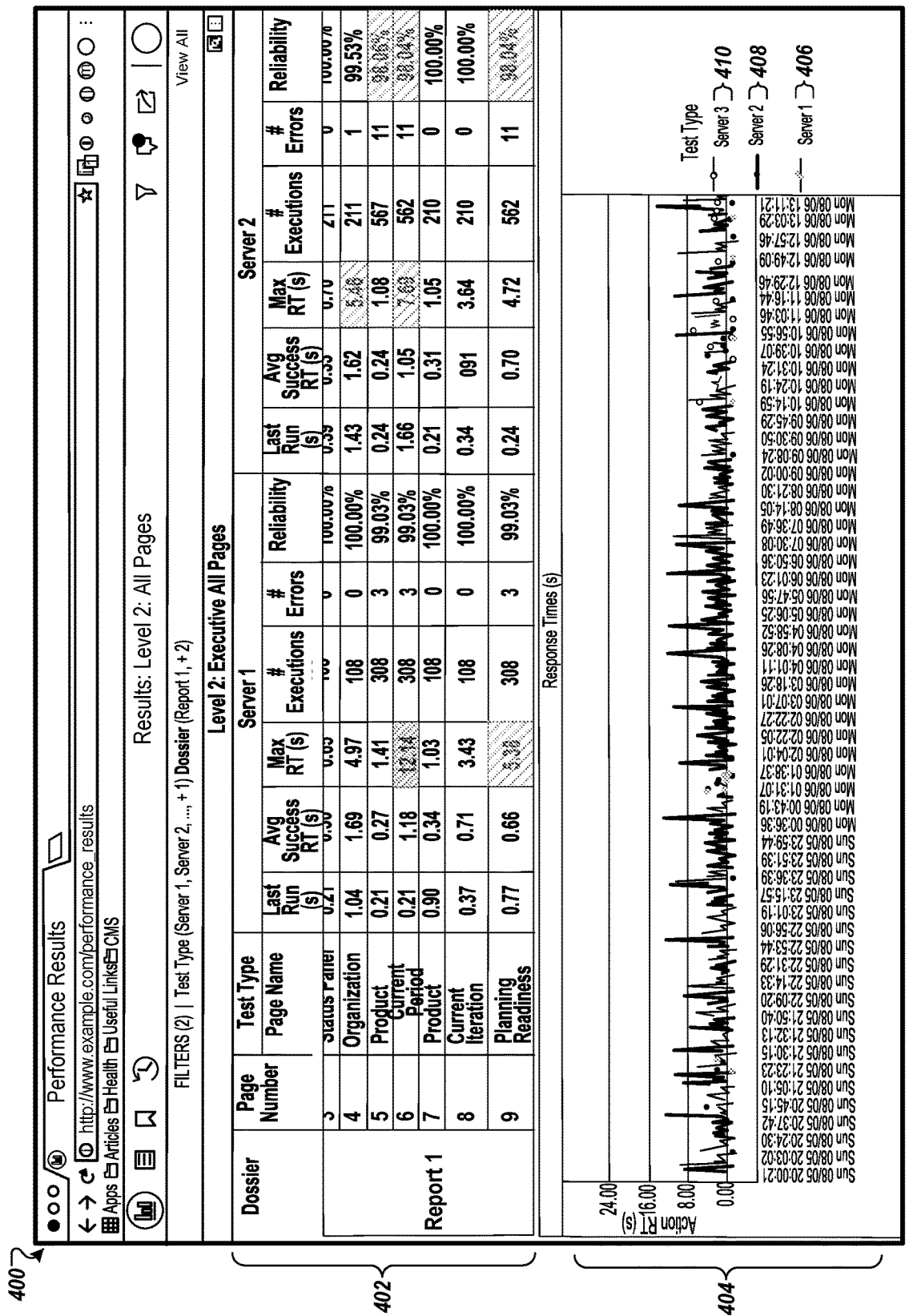
FIG. 4 is a diagram that illustrates an example interface displaying performance data.

FIG. 4 is a diagram that illustrates an interface 400 displaying a detailed view of performance data, including calculated performance metrics. The interface 400 includes a table 402. The table 402 provides a detailed view of the task of generating all pages of Report 1. The calculated performance metrics include calculated performance metrics for each page of an example Report 1 (e.g., the first report 124 as shown in FIG. 1). The performance metrics include a last generation performance time for each page in seconds, a maximum time for each page in seconds, the number of tests of each page, and a total number of errors experienced during the generation of each page.

Each of the pages a report may be provided a name. The pages names may be user-definable. As shown, a third page of Report 1 is named "Status Panel", a fourth page of Report 1 is named "Organization", a fifth page of Report 1 is named "Product", a sixth page of Report 1 is named "Current Period", a seventh page of Report 1 is also named "Product", an eighth page of Report 1 is named "Current Iteration", and a ninth page of Report 1 is named "Planning Readiness." As an example, with respect to FIG. 1, a user of the server system 130 may be able to provide the names for each of the pages in the first report 124 through one of the client devices 132.

The performance metrics are also organized by the server from which Report 1 and/or the pages of Report 1 are requested. As shown, performance metrics are provided for a first server 406 ("Server 1") and a second server 408 ("Server 2").

If a performance metric is determined to be associated with a warning or an error (e.g., by the performance monitoring module 118 as shown in FIGS. 1 and 3), then the performance metric may be distinguished from other performance metrics. For example, if a performance metric is determined to be below a warning threshold but above an error threshold, it may be presented with a warning color (e.g., yellow) or shade that is different from a healthy color (e.g., green) or shade (or absence of shade) and different from an error color (e.g., red) or shade.

As shown, healthy performance metrics are left unshaded, performance metrics indicating a warning are marked with a first shade, and performance metrics indicating that an error has likely occurred are marked with a second shade that is darker than the first shade. Here, a warning threshold for a maximum generation time may be 5.00 seconds, and an error threshold for a maximum generation time may be 10.00 seconds. In addition, a warning threshold for a minimum reliability may be 99.00%. Because generation of page 6 of Report 1 requested from Server 1 took 5.38 seconds, the performance metric met the warning threshold but not the error threshold. As such, the performance metric of a 5.38 second time indicates a warning. Similarly, because generation of page 5 of Report 1 requested from Server 1 took 12.14 seconds, the performance metric met the error threshold. As such, the performance metric of a 12.14 second time indicates that an error has likely occurred. The detection of an error may trigger a higher priority action than the detection of a warning.

The interface 400 also includes a graph 404 depicting the time in seconds to execute all pages of Report 1 over time. The graph 404 is a line graph with three different data sets. The graph 404 includes a first data set representing the performance associated with the first server 406 for the generation of all pages of Report 1. The graph 404 includes a second data set representing the performance associated with the second server 408 for the generation of all pages of Report 1. The graph 404 includes a third data set for the performance associated with a third server 410 for the generation of all pages of Report 1.

In some implementations, the interface 400 multiple graphs instead of the single graph 404. For example, the interface 400 may include a graph for each of the data sets. Specifically, the interface 400 may include separates graphs, each graph representing data from either the first server 406, the second server 408, or the third server 410.

With respect to FIG. 3, the interface 400 may be presented on an administrator device 312. The interface 400 may be generated based on data included in a notification sent by the management system 110 to the administrator device 312. In some cases, the interface 400 may presented on one or more other devices. For example, the interface 400 may be presented on one or more of the client devices 132 as shown in FIG. 1.

Figure 5:
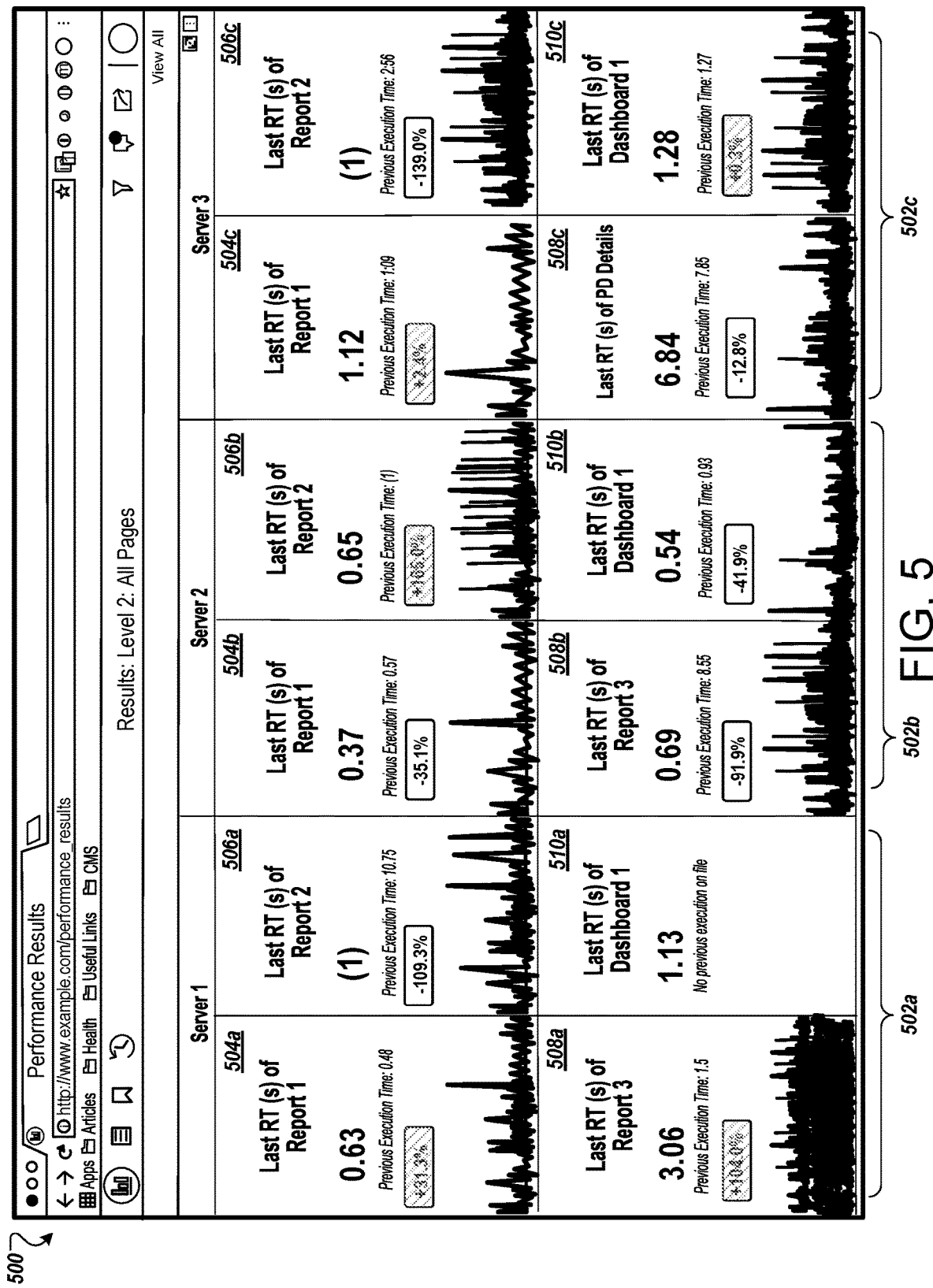
FIG. 5 is a diagram that illustrates an example interface displaying performance data.

FIG. 5 is a diagram that illustrates an interface 500 displaying a simplified view of performance data, including some calculated performance metrics. The interface 500 is broken up into three columns, one for each of the servers to which requests were made. There is a first column 502a for an example Server 1 (e.g., the first server 406 as shown in FIG. 4). There is a second column 502b for an example Server 2 (e.g., the second server 408 as shown in FIG. 4). There is a third column 502c for an example Server 3 (e.g., the third server 408 as shown in FIG. 4). Each of the columns includes performance metrics for a particular task.

Each column of columns 502a-502c includes an interface element 504 for the task of generating Report 1. Each column of columns 502a-502c includes an interface element 506 for the task of generating Report 2. Each column of columns 502a-502c includes an interface element 508 for the task of generating Report 3. Each column of columns 502a-c includes an interface element 510 for the task of generating Dashboard 1.

Each of the interface elements 504a-504c includes performance metrics relating to the task of generating Report 1. Each of the interface elements 506a-506c includes performance metrics relating to the task of generating Report 2. Each of the interface elements 508a-508c includes performance metrics relating to the task of generating Report 3. Each of the interface elements 510a-510c includes performance metrics relating to the task of generating Dashboard 1. These performance metrics include a last time, an time for the generation immediately preceding the last generation, a percent change between the two times, and a graph depicting the task time on the particular server over time. A positive percent change in time indicates decreased performance and may be shown in a first color (e.g., red) or shade different from a negative percent change. A negative percent change in time indicates increased performance and may be shown in a second color (e.g., green) or shade (or absence of shade) different from a positive percent change.

Figure 6:
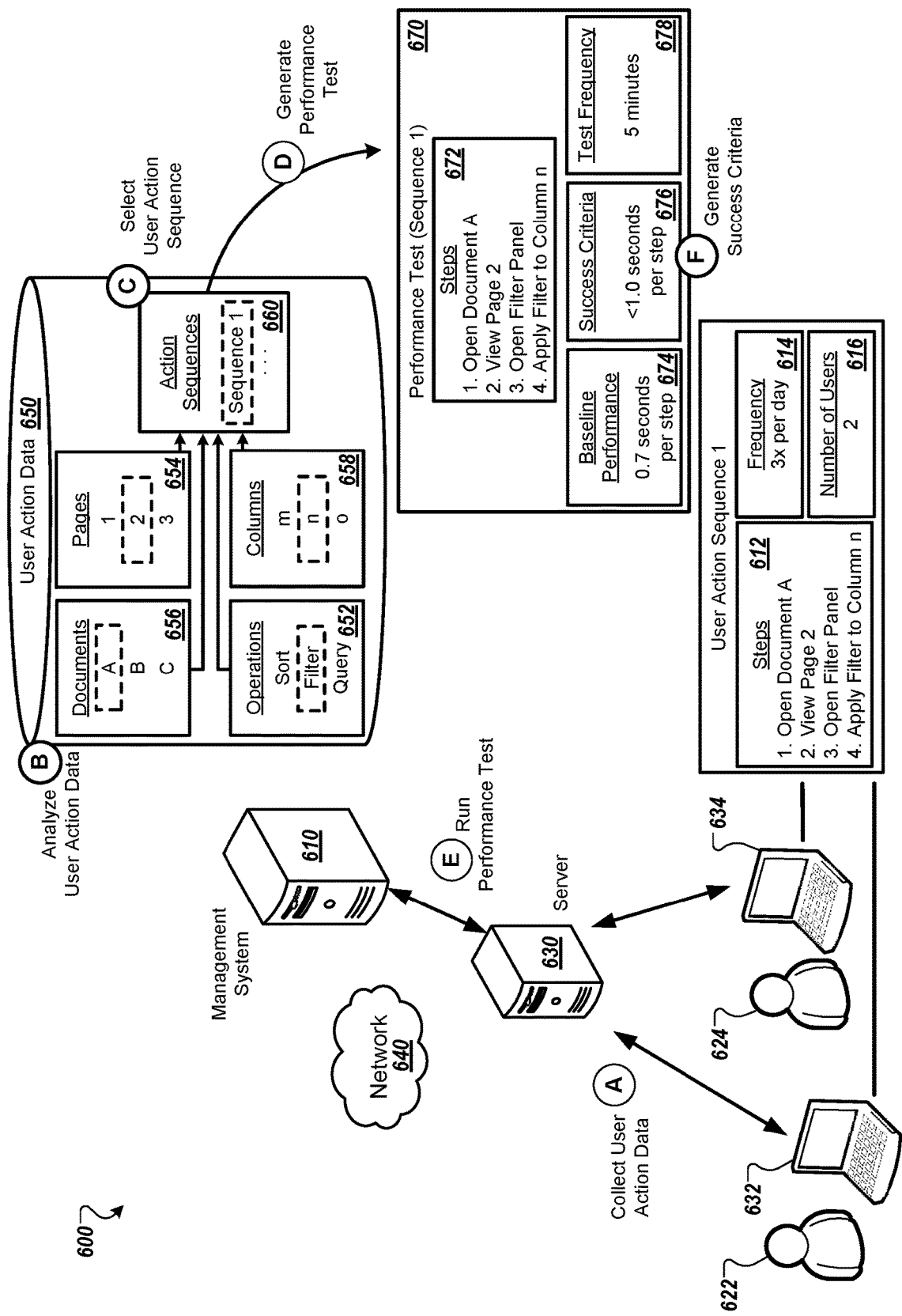
FIG. 6 is a diagram that illustrates an example system for creating performance tests.

FIG. 6 is a diagram that illustrates an example system 600 for creating performance tests. The system 600 includes a management system 610 that generates performance monitoring tests, a server system 630 to be monitored, user devices 632, 634, and a network 640. The system 600 generates performance tests and success criteria based on commonly-used user action sequences. The performance tests can include, for example, sequences similar to the task list 112 of the system 100. Instead of testing a pre-defined or automatically selected task list, the system 600 can generate performance tests of entire sequences of events determined from actual usage data. In this way, the system 600 creates performance tests that simulate actions that users are commonly performing.

FIG. 6 illustrates various events, shown as stages (A) to (F), with each representing a step in an example process. Stages (A) to (F) may occur in the illustrated sequence, or in a sequence that is different from the illustrated sequence. For example, some of the stages may occur concurrently.

The management system 610 is configured to monitor the performance of one or more different systems. In the example of FIG. 6, the management system 610 monitors the performance of the server system 630 and can communicate with the server system 630 over the network 640.

The server system 630 can include one or more computing devices. The server system 630 can communicate with the user devices 632, 634 over the network 640, in addition to the management system 610. The server system 630 may be an onsite server, an offsite server, or an environment hosted by a cloud computing platform (e.g., Amazon Web Services (AWS), Microsoft Azure, etc.). The server system 630 may be provided, owned, and/or operated by a third-party with respect to the management system 610.

The user devices 632, 634 may be computing devices, such as desktop computers, laptop computers, cell phones, smart phones, and/or tablet devices.

The network 640 can include public and/or private networks and can include the Internet.

As shown in FIG. 6, at stage (A), the server system 630 collects user action data. The user action data can include, for example, actions performed by the users 622, 624 using the user devices 632, 634. The users 622, 624 can perform actions such as generating reports, viewing dashboards, loading a document, filtering a document, scrolling through a document to a particular location, etc.

The users 622, 624 each perform a particular sequence three times per day. The sequence, User Action Sequence 1 (Sequence 1), includes steps 612. The steps 612 include: (1) Open Document A; (2) View Page 2; (3) Open Filter Panel; and (4) Apply Filter to Column 'n'. The frequency 614 of performing Sequence 1 is three times per day, and the number of users 616 performing Sequence 1 is two.

The server system 630 collects the user action data, including the steps of Sequence 1 performed by the users 622, 624. The server system 630 can send the user action data to the management system 630 over the network 640. The management system 630 can store the user action data in a data storage 650.

At stage (B), the management system 610 analyzes the user action data in the data storage 650. The management system 610 can analyze the user action data collected over a designated period of time, e.g., one day, one week, or one month. The management system 610 can analyze the user action data to identify and select common user actions. The management system 610 can also identify and select commonly accessed resources, e.g., reports and documents.

For example, the management system 610 can identify commonly used documents 656, e.g., Documents A, B, and C. In some examples, the management system 610 can rank the documents 656, e.g., from most used documents to least used documents. In some examples, the management system 610 can select and identify a certain percentage of documents, e.g., the documents 656 with the top ten percent of usage, as commonly used documents. For example, the management system 610 can rank Documents A, B, and C, and identify that Document A is the most commonly used document. Similarly, the management system 610 can select commonly used pages 654 of documents 656. For example, out of Pages 1, 2, and 3, the management system 610 can identify that Page 2 is the most commonly used page of Document A.

The management system 610 can analyze the user action data to identify and select common user operations 652. Example operations 652 can include sorting, filtering, and querying. The management system 610 can also identify commonly manipulated columns 658 of a document, e.g., columns 'm', 'n', and 'o'. In some examples, the management system 610 can identify the most common operations 652 performed on each column 658. For example, the management system 610 can identify that users commonly perform the operation 652 of filtering on the column 658 'n'.

The management system 610 can analyze the user action data to identify correlations between common user actions and certain dates or times. For example, the management system 610 can determine that certain documents 656 are used more frequently on Mondays than on Fridays, or more frequently at the end of the month than at the beginning of the month. In another example, the management system 610 can determine that certain operations are performed more frequently early in the morning than later in the afternoon.

At stage (C), the management system 610 selects a user action sequence 660. The user action sequence 660 can be a sequence of steps commonly performed by one or more users. In some examples, the user action sequence 660 can include a combination of commonly used documents 656, pages 654, operations 652, and columns 658. The management system 610 can select a user action sequence 660 based on, for example, users commonly filtering column 'n' on page 2 of document A, i.e., performing Sequence 1.

In some examples, the management system 610 can select a certain number of user action sequences 660. For example, the management system can select a predetermined number, e.g., 3, 5, or 10 of the most common user action sequences 660. In some examples, the management system 610 can select a certain percentage, e.g., the top ten percent most common user action sequences 660.

In some examples, the management system 610 can select a user action sequence 660 based on a frequency that the user action sequence 660 is performed. A frequency can be a number of times that one or more users perform the user action sequence 660 over a period of time, e.g., one hour, one day, or one week. For example, Sequence 1 is performed three times per day by two users, for a total of six times per day.

The management system 610 can compare the frequency that the user action sequence 660 is performed to a threshold frequency. The threshold frequency may be selected by an administrator. For example, an administrator may specify a threshold frequency of at least five times per day. Since Sequence 1 is performed six times per day, and the threshold frequency is five times per day, the management system 610 can determine that Sequence 1 is performed more frequently than the threshold frequency. Based on determining that Sequence 1 is performed more frequently than the threshold frequency, the management system 610 can select Sequence 1.

In some examples, the threshold frequency can be based on a percentage of users performing a particular user action sequence within a given time period. For example, a threshold frequency can be at least 30 percent of users performing the particular user action sequence at least once per week.

At stage (D), the management system 610 generates a performance test 670. The management system 610 generates the performance test 670 based on the selected user action sequence 660, e.g., Sequence 1. The performance test 670 includes the steps 672 of Sequence 1, i.e., (1) Open Document A; (2) View Page 2; (3) Open Filter Panel; and (4) Apply Filter to Column 'n'.

At stage (E), the management system 610 runs the performance test 670. The management system 610 runs the performance test a number of times to obtain baseline performance data 674. To run the performance test, the management system 610 can send a request to the server system 630 to perform Sequence 1, including the Steps 1 to 4. The management system 610 can collect performance data from the server system 630 related to the performance of Sequence 1. For example, the management system 610 can collect performance data from the server system 630 that includes the time to perform each step and/or the total time to perform Sequence 1.

In some examples, the management system 630 runs the performance test 670 a number of times based on pre-programmed settings. In some examples, the number of times can be selected by an administrator. For example, an administrator may specify that the performance test runs, e.g., 10 times, 100 times, or 1,000 times.

In some examples, the management system 610 can run the performance test 670 a number of times based on the performance test results. For example, the management system 610 can repeat the performance test 670 until the performance test results are within a designated standard deviation.

The baseline performance data 674 can include averages of certain performance metrics over multiple cycles of testing. The baseline performance data 674 can include, for example, the average time to perform each step of the performance test 670. For example the baseline performance data 674 for the performance test 670 of Sequence 1 includes an average time of 0.7 seconds to perform each step 1 to 4. The baseline performance data 674 can also include thresholds that represent average response time, maximum response time, etc., for Sequence 1.

At stage (F), the management system 630 generates success criteria 676 for the performance test 670. For example, based on the baseline performance data 674 of 0.7 seconds per step, success criteria 676 for Sequence 1 can be that the time to perform each step of Sequence 1 should be less than 1.0 seconds. The management system 630 can determine the success criteria 676 based on pre-programmed settings. For example, an administrator may specify that the success criteria 676 includes a time limit that exceeds the baseline performance data 674 by a certain percentage, e.g., 20%, 30%, or 40%.

The success criteria 676 can include criteria for various performance metrics. For example, the management system 610 can determine success criteria 676 for metrics including a response time, a task completion time, and an individual action time (e.g., time to load an item or part of an item, time to render an item or part of an item, time to scroll through an item, time to filter an item, etc.).

The management system 610 determines a test frequency 678 for the performance test 670. For example, the management system may determine a test frequency 678 of five minutes for the performance test 670 for Sequence 1. In this example, every five minutes, the management system 610 runs the performance test 670 on the server system 630.

In some examples, the management system 610 determines a higher test frequency 678 at certain times compared to other times. For example, based on analyzing the user action data, the management system 610 may determine that users perform Sequence 1 more frequently early in the morning compared to later in the afternoon. The management system 610 may therefore determine a higher test frequency, e.g., five minutes, in the morning, and a lower test frequency, e.g., 10 minutes, in the afternoon.

After running the performance test 670, the management system 630 can provide the performance test results to a performance monitoring module, e.g., the performance monitoring module 118 of the system 100 and the system 300.

As discussed above, the management system 630 can automatically generate performance tests for specific resources (e.g., documents, data cubes, etc.) based on the manner that those resources are actually used. These performance tests can be implemented automatically or may be recommended to an administrator for approval. The management system 630 can enable other techniques for defining customized performance tests. For example, an administrator may be able to designate a set or sequence of user actions from a log for a specific session of user activity to be included in a test. As another example, an application that leverages the management system 630 can include functionality to record user actions and save them as action sequences for a performance test. For example, the application can include a control that enables a user to start recording user actions, perform a number of user actions (e.g., load a document, navigate to a specific portion of the document, apply a filter, add an annotation, etc.), and then indicate the end of the action sequence. The management system 630 can use this manually defined set or sequence of actions as a performance test or within a performance test.

The performance tests created using the techniques discuss for FIG. 6 can be run as part of the testing discussed with respect to FIGS. 1-5. For example, the task list 112 of FIG. 1, rather than simply including documents to retrieve, can include a list of performance tests that each include retrieval of a resource as well as simulated user interactions with the resource. The performance tests can be executed in the same manner discussed for FIGS. 1-5, for example, by cycling repeatedly through a list of performance tests, and with resource requests as well as simulated user interactions being transmitted through a headless browser 116 or other technique to simulate user actions.

Figure 7:
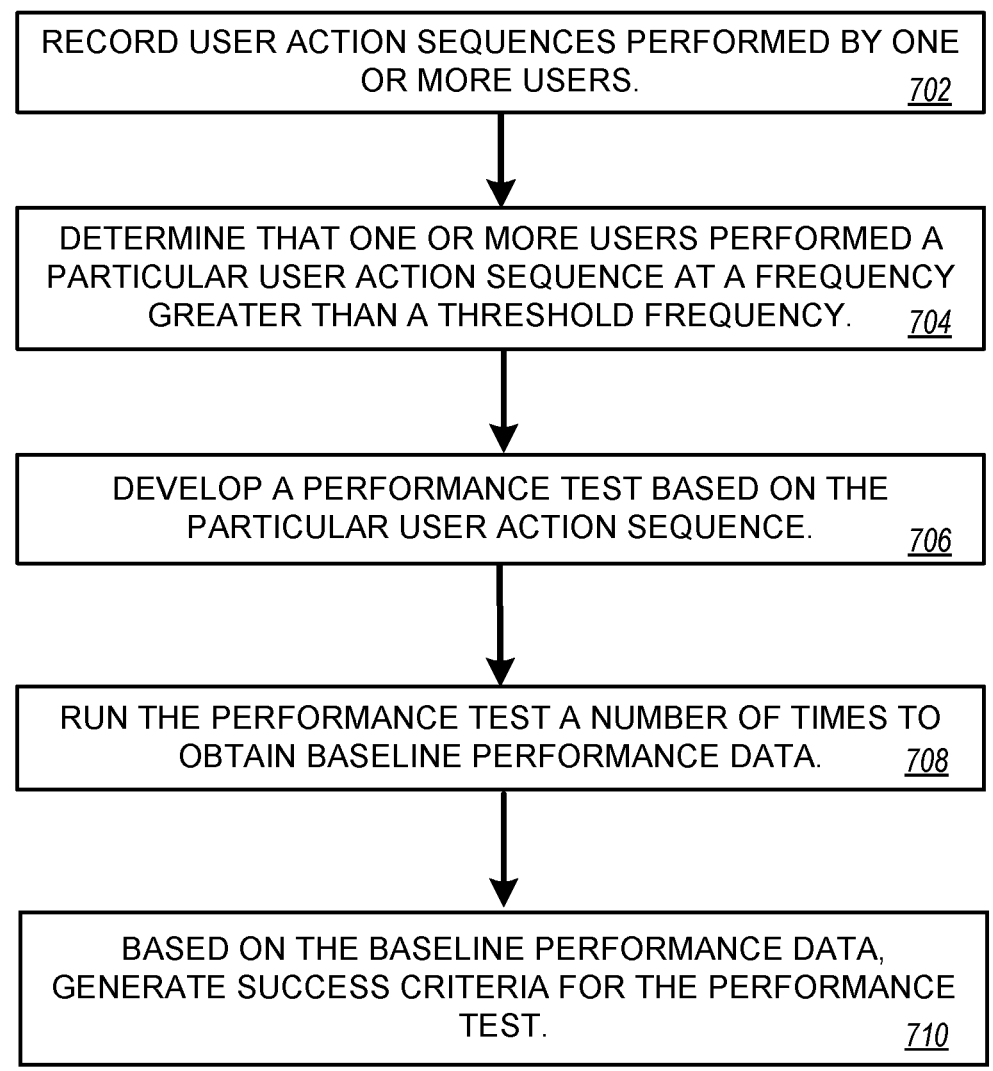
FIG. 7 is a flow diagram that illustrates an example process for creating performance tests.

FIG. 7 illustrates an example process 700 for creating performance tests. The process 700 can be performed by a computer system that includes one or more computers, e.g., the management system 610 of the system 600.

The management system records user action sequences performed by one or more users (702). Example actions of a user action sequence can include opening a document, viewing a page of the document, sorting data within the document, filtering data within the document, and/or putting data from the document into a chart. An example user action sequence is User Action Sequence 1 (Sequence 1) of the system 600.

The management system determines that one or more users performed a particular user action sequence at a frequency greater than a threshold frequency (704). A threshold frequency can be, for example, a number of times that the one or more users perform the particular user action sequence per hour, per day, or per week. In some examples, the threshold frequency can be a total number of times that the user action sequence is performed within a given time period. For example, a threshold frequency can be a total of at least thirty times per day; where the thirty times per day can include two users each performing the particular user action sequence twice per day, or ten users each performing the particular user action sequence three times per day. In the example system 600, Sequence 1 is performed three times per day by two users, for a total of six times per day. The management system determines that the Sequence 1 total of six times per day is greater than the threshold frequency, e.g., five times per day.

The management system develops a performance test based on the particular user action sequence (706). The performance test can include individual steps of the particular user action sequence. For example, in the system 600, the performance test for Sequence 1 includes Steps 1 to 4. The management system can develop a performance test based on performing the Steps 1 to 4.

The management system runs the performance test a number of times to obtain baseline performance data (708). The management system can send a request to a server system to perform the steps of the performance test. The management system can collect performance data from the server system. The management system can repeat the performance test a specified number of times e.g., 10 times, 100 times, or 1,000 times. The baseline performance data can include averages of certain performance metrics over the multiple cycles of testing. For example, the baseline performance data can include the average time to perform each step of the performance test. The baseline performance data for the performance test of Sequence 1 includes an average time of 0.7 seconds to perform each Step 1 to 4.

Based on the baseline performance data, the management system generates success criteria for the performance test (710). The management system can generate success criteria such that a failure to meet success criteria indicates an anomaly in the performance of the server system. For example, success criteria can include that the time to perform a particular sequence should be less than 30% greater than the baseline performance data. Success criteria for Sequence 1 includes that the time to perform each step of Sequence 1 should be less than 1.0 seconds. As a result, the management system has a standard or reference with which to judge the performance of different actions or sequences of actions.

Figure 8:
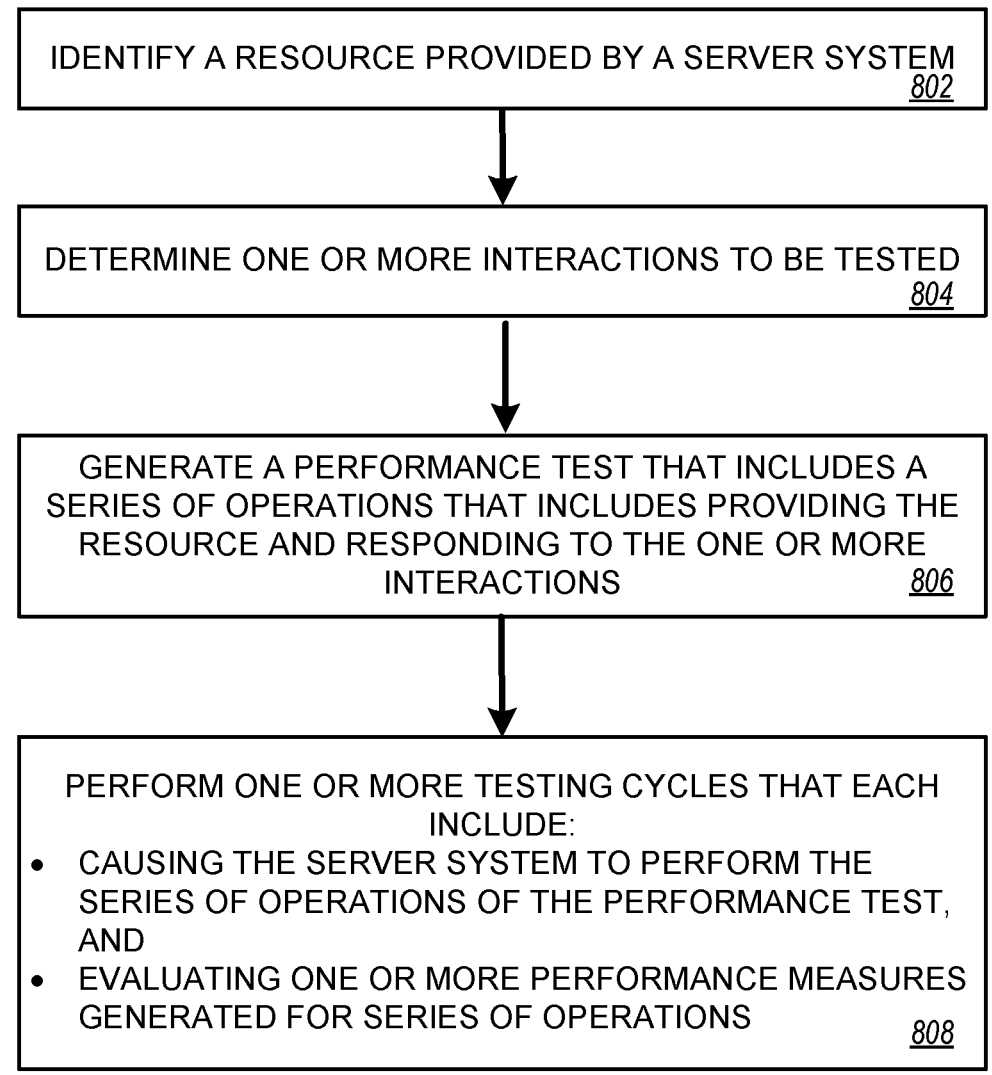
FIG. 8 is a flow diagram that illustrates an example process for creating performance tests.

FIG. 8 is a flow diagram that illustrates an example process for creating performance tests. The process 800 can be performed by a computer system that includes one or more computers, e.g., the management system 610 of the system 600.

The process 800 can be used to generate performance tests that can test the performance and success of interactions of the type that are often user-initiated and are often not regularly tested. For example, rather than simply testing a response time for a server to provide a document, the test may further simulate user interactions (e.g., following links, applying filters, generating reports, adjusting user interface settings, and so on) and monitor the performance of those simulated user interactions. This type of test can be performed repeatedly, to detect when changes to the typical user experience have occurred, including changes in performance for responses to user interactions with already loaded documents. This type of testing can indicate performance issues that would not be detected through the mere loading of a document. For example, if there is a bad dependency in a table on page three of a document, merely loading a document would not show this issue, but a test that navigates to that specific page and interacts with the table may reveal errors or performance slowdowns that indicate the problem.

As an example, a user may regularly perform a certain sequence of actions, e.g., open a particular report or dashboard, scroll to the third page, filter data in the page by location, and then group results by category. If there is a problem with this sequence, such as a bad join condition or slow access for the source of the data that is filtered and group, the problem would not be detected from simply testing the loading of the document alone. As a result, it can be very useful to test server operations that respond to user interactions and even sequences of multiple user interactions in succession This type of test can provide both broader information about server performance than is typically available, as well as providing more fine-grained information about performance. For example, the interactions can show the overall performance of complex series of interactions, such as opening a document, applying a filter, and generating a document from the results. Similarly, the performance monitoring can measure performance for individual interactions within a sequence that is part of a test, such as the system's responses to actions such as switching from one page to the next, interacting with interactive user interface controls, saving a document, etc.

Many documents (e.g., web pages, dashboards, etc.) involve ongoing interactions with a server to respond to user-initiated actions, such as clicking a link, scrolling to the bottom of a list, selecting a filter control, re-sizing a map or other visualization etc. There are also some user interactions or sequences of user interactions that are common and can be determined from log data or other records of how resources were used. If there is some issue with the common flow or sequence of operations by users, typical performance testing often does not detect the issue. For example, a document may load very quickly, but after loading functionality of the document (e.g., saving, editing, adjusting a view, filtering, etc.) that depends on the server may be very slow or even may not work at all (e.g., due to an unavailable resource, an improper dependency, an error in a script, etc.). The testing approach described herein enables a more full picture of the performance involved in the complete user experience, not just document loading alone, and can monitor the performance of these other user-initiated actions on an ongoing basis.

The performance test may be based on a sequence of simulated interactions of the type that users would normally initiate. For example, when generating the test, the system can use usage logs to determine the actions that user most often perform with a certain type of document or resource generally (e.g., for dashboards, or for data cubes, etc.). The system can optionally determine the actions or sequences of actions that users perform most frequently for individual documents, so that documents can be tested with the interactions that users actually have with those documents. The system can then determine sequences of user interactions, e.g., representative user actions or common user actions from usage logs, and create the test to simulate those sequences of actions. The tests can involve applying the sequences of user interactions to documents identified as representative of a set or documents that are the most frequently used.

In some implementations, the system provides a way for an administrator to record a series of interactions to be included in a performance test. For example, an application or user interface for the testing system can provide a menu item or button that the administrator can select to begin recording a sequence of actions to test. After the user initiates the recording, the user can cause interactions (e.g., loading a document, scrolling to a particular page, applying a filter, changing a visualization parameter, etc.) that are tracked by the system. The administrator then selects a control to end recording. The sequence of actions the administrator performed can then be used as a sequence to test in upcoming testing cycles. As another example, a user interface can provide a list of available actions and the administrator can select actions from a list to build a set or sequence of operations to be tested.

In enterprise systems, the number of documents and other resources can be very high, as can be the variety of interactions of different users. As a result, manual coding of performance tests is not always feasible or scalable for the enterprise. As a result, the system can automatically generate performance tests based on usage logs, telemetry data provided by client devices, and other information captured about the use of documents, resources, data sets, and so on. For example, the system can capture telemetry data, usage data, metadata, and other records indicative of user actions and system usage. This can include tracking user interactions at client devices and/or tracking the requests that are made to servers. The system can count the amount of times that different user actions and sequences of user actions are performed, then identify which actions or sequences of actions occurred the most (e.g., the top N or N % of actions or sequences that occurred most frequently where N is an integer, or those that occurred at least a threshold number of times, etc.). The system can then add the actions or action sequences identified as most frequently occurring to one or more tests. Similarly, the system can select the resources to be tested in the same manner, e.g., selecting the top N or N % of a given type of resources accessed most frequently. Tests can be generated and performed for resources in each of multiple different resource types, e.g., by testing the most frequently used dashboards, testing the most frequently used data cubes, testing the most frequently used reports, and so on.

The generated performance tests can be run repeatedly. For example, a single testing cycle may test ten different documents, each one being loaded in a headless browser or other simulated environment and being interacted with using a corresponding set of simulated user interactions. Then after an interval, such as 1 minute, 5 minutes, 1 hour, etc., another testing cycle can be performed with the same documents and interactions. Over time, the system can adapt the test according to changes in user behavior and access patterns, for example, to change which resources are loaded in the testing cycle and which interactions are performed and tested for each.

The process 800 includes identifying a resource provided by a server system (802). For example, the management system can access usage logs, file access metadata, or other records. From these records, the management system determines how often or how recently different resources have been used. The management system then selects one or more resources to use in a performance test. The selected resources can be, for example, the top N resources most frequently used over a recent time period (e.g., the last day, the last week, the last month, etc.), where N is an integer. As another example, the N % of resources with the highest usage over a recent time period can be selected (e.g., the 1% of documents in a document library that are most frequently accessed). In some implementations, a resource is selected by an administrator and indicated through user input. The system can provide data for a user interface having controls that enable an administrator to manually add or remove resources from a list of resources to be tested.

The resource(s) tested can be from any of various types, such as a web page, a web application, a file, a data source, a database, a data set, a data cube, a dashboard, a document, and so on. Access to the resource is provided by the server system. For example, the server system can provide the resource by serving the resource over a network, or by providing a service (e.g., a query processing service, a database service, etc.) that enables use or access to the resource.

In some implementations, the one or more interactions are determined from usage data (e.g., usage logs, telemetry data from client devices, logs of requests to the server system, application data, etc.) that indicates how the identified resource has been used. For example, the interactions of users with the resource can be tracked, and the most common interactions over a time period can be selected (e.g., those that have at least a minimum level of occurrence, a set of the most frequently performed interactions, etc.). As another example, interactions with similar resources or resources of the same type can be considered, and the most common interactions with the resources in the group can be selected.

In some implementations, the management system receives activity data indicating user interactions with multiple resources provided by the server system. The management system evaluates the activity data to identify resources that satisfy one or more criteria. The criteria may include frequency of use, recency of use, use by a user in a particular role or priority level (e.g., an executive or other high-priority user), use by at least a minimum number of users, instances of use spanning at least a minimum duration of time (e.g., to focus on persistent documents rather than temporary ones), and so on. The management system may automatically select resources to be tested based on this criteria, and may automatically generate corresponding operations for the performance test. In other cases, the management system may provide the selected resources to a user device for presentation, e.g., as a recommendation of one or more identified resources to be tested which can be accepted or rejected by an administrator.

The process 800 includes determining one or more interactions to be tested for the resource (804). The one or more interactions can be determined based on user input or records of prior user interactions. For example, the management system can provide data for a user interface that allows an administrator to select user actions or sequences of user actions to use in testing a resource. As another example, the system can record a series of actions that the administrator carries out and use that series of interactions for testing the resource. The management system may receive data indicating a series of user interactions with the resource that a user designated to be included in the performance test. The performance test may later be generated to include operations representing the series of user interactions with the resource.

In some implementations, the management system can receive activity data indicating user interactions with the resource. The management system can evaluate the activity data to identify a sequence of multiple user interactions that was performed at least a threshold number of times. The management system can the provide, to a user device for presentation, a recommendation of the sequence of multiple user interactions to be tested in the performance test.

In some implementations, the management system accesses user activity data indicating multiple sequences of user interactions with the resource over a period of time. The management system selects a subset of the user interactions with the resource based on criteria such as an amount of times the respective user interactions with the resource occur in the multiple sequences of user interactions. When generating the performance test, the management system can include, in the series of operations of the performance test, operations corresponding to the interactions in the selected subset.

When multiple different resources are selected to be tested, a corresponding set of interactions can be selected for each resource. The set of interactions for each resource may be different, based on the different manners in which users may use different documents. For example, for a first spreadsheet document, users may commonly open a view of a particular tab and filter based on a particular column, and that sequence of interactions is selected for the test of that document. For a second spreadsheet document, users may commonly perform a different set of interactions, such as switching between views and clicking hyperlinks in the cells, and thus a different sequence of interactions will be selected for this second spreadsheet document than for the first spreadsheet document. This illustrates how the interactions to be tested can be automatically and programmatically be determined by the management system based on the actual usage of the documents. Of course, more general interactions, such as those determined based on aggregate interaction measures across multiple resources of a same type (e.g., the set of all spreadsheets) may additionally or alternatively be selected.

The process 800 includes generating a performance test for the server system (806). The performance test includes a series of operations for the server system to perform. The series of operations includes (i) providing the resource and (ii) responding to the one or more interactions with the resource. The one or more interactions can be simulated user interactions, such as artificially generated events that simulate a user performing actions such as scrolling, clicking a button, adjusting a view, changing data displayed, and so on. Thus the performance test can be specify that access to the identified resource should be requested, and then the determined one or more interactions should be simulated. The performance test can also specify aspects of performance to be measured (e.g., availability, response time, capacity, throughput, bandwidth, accuracy or completeness of results, etc.) and parameters to specify how scores for these aspects should be generated. The performance test can have, in data defining the test or in other associated data, reference values (e.g., thresholds, ranges, expected values, evaluation criteria, etc.) that can be used to evaluate the results of the performance test and determine whether a measured performance score represents an acceptable or unacceptable level of performance.

The performance test may specify multiple resources, each with one or more corresponding actions to perform and for which the performance should be measured. The performance test can be generated so that each testing cycle using the test evaluates each of the different references and their corresponding interactions.

The process 800 includes performing one or more performance testing cycles based on the performance test (808). Each performance testing cycle can include (i) causing the server system to perform the series of operations of the performance test and (ii) evaluating one or more performance measures that characterize the performance of the series of operations by the server system. Performing a testing cycle can include sending requests to the server system to request a resource (e.g., retrieve or load a document) and to simulate the one or more interactions as if a user were causing the interactions with the served resource. One way that the management system can do this is to use a browser instance (e.g., a "headless" browser instance that does not have an associated display or actual user) to request a document, to load the resource at the management system, and then to initiate the interactions through the browser. Other ways of simulating user interactions can be performed, such as by creating virtual user sessions and sending requests with headers or metadata that have the same characteristics as actual user requests.

In some implementations, the performance test includes operations that simulate loading of a specific document, presenting a specific portion of the specific document, and activating one or more interactive user interface controls available for the specific portion of the specific document.

In each testing cycle, the management system can determine one or more performance measures for the series of operations of the performance test. For example, the one or more performance measures can be based on or can indicate at least one of: a duration of time to complete the series of operations; a duration of time to complete one or more individual operations in the series of operations; an amount or type of errors occurring during the series of operations; or an accuracy of a result of performing the series of operations.

In further detail, for each testing cycle, the management system determines performance measures for each resource tested, and for individual simulated interactions and/or for groups or sequences of simulated interactions. For example, the performance test may specify measures to generate, such as to check availability of the tested functionality and to test the response time for each interaction and for the overall series of operations involving the resource. The management system can then compare the performance measures with corresponding reference values determined for the test (e.g., predetermined thresholds) or with historical performance measures (e.g., average performance over a recent time period or over the previous M performance cycles). The management system can then store the performance measures and evaluation results. Based on the results of the evaluation, the management system can selectively perform other actions, such as to notify an administrator of instances of poor performance that are detected or to make configuration changes to improve performance.

Based on the evaluation of one or more of the performance measures, the system that performs the testing can perform any of various actions. For example, management system can adjust one or more operating parameters of the server system. The adjustments can be made to improve performance, such as to restore performance to within desired range in response to detecting that performance is outside the range. As another example, the management system can provide a notification regarding the operation of the server system. The notification can indicate one or more performance measures, reference performance levels, indications of whether or not the desired performance is provided, and so on.

Once the performance test is run, the management system can take various actions based on the performance results obtained. These actions can include notifying an administrator of the identified performance issue, for example, through an e-mail message, a text message (e.g., short message service (SMS) message), a notification on a dashboard, information panel, or other user interface, and so on. The system can provide the determined performance measures, along with reference measures (e.g., thresholds, baseline performance measures, historical performance measures, etc.), as well as indications of the specific resource(s) and action(s) that were determined to have inadequate performance. If errors occurred or of the test could not be completed, these results can be provided also. The system can store the performance results for each testing cycle and can provide historical data about previous tests to show the progression and history of performance for the server and for the resource for which performance was detected to be inadequate. Similarly, the system can determine and store contextual information about the tested server system at the time the test was run, for example, giving context such as the configuration settings, the network connection characteristics, the load level (e.g., number of requests or tasks being run, a number of users connected, etc.), and so on.

As another example, if performance for loading or interaction with a resource is outside an appropriate range or otherwise does not meet a desired level of performance, the system can initiate actions to improve performance. For example, in response to determining that an action takes longer than expected, the system can improve performance by: caching the resource for quicker access; increasing hardware resources allocated (e.g., CPUs, memory, etc.) for a server that serves the resource; restarting or adjusting a configuration of the corresponding server; adjusting load balancing to reduce load on the corresponding server; starting an additional server environment, potentially a remote cloud-computing-based environment, to improve performance; reassigning users or devices among available servers; and so on.

Some actions can be taken to improve performance for specific actions that are identified as being performed slowly. For example, if a filtering step is determined to be performed slowly (e.g., taking longer than its own typical or historical time, or longer than completion times for other filter operations generally), the system may cache the data set needed for the tested operation, thus speeding up the filtering operation. As another example, the system may pre-filter the data by one or more frequently used metrics or criteria and cache the already-filtered subset(s) of data. Using this type of action, the system can automatically monitor and improve performance for the resources and user actions that are most frequent and will affect the greatest number of user interactions. For many adjustments prompted by the performance testing, the changes can improve performance for much more than the specific documents and actions tested. For example, identifying that a specific filtering operation for a specific document has poor performance can trigger the system to increase a cache size or improve load balancing that can help improve performance for many other operations and documents in addition to the ones tested.

Multiple performance testing cycles repeated at an interval, for example, to continually verify that the performance of common resource accesses and user interactions with those resources are within acceptable levels. In some cases, the resource to be tested is a document, and the one or more simulated user interactions comprise an interaction by at least one of navigating to a particular portion of the document, scrolling, editing, annotating, saving, filtering, selecting, highlighting, printing, copying, zooming, clicking, or dragging.

As new user activity data is received, the set of resources tested can be updated, as can the sets of interactions with the resources. As a result, the management system can update or adapt the performance test from time to time so that the performance test corresponds to the set of resources and user interactions that are most commonly used as usage patterns change. In some implementations, rather than change the test automatically, changes to resources and interactions to be tested can instead be recommended to an administrator for approval before they are carried out.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
   identifying, by the one or more computers, a resource provided by a server system;
   determining, by the one or more computers, one or more interactions to be tested for the resource, the one or more interactions being determined based on user input or records of prior user interactions;
   generating, by the one or more computers, a performance test for the server system, the performance test comprising a series of operations for the server system to perform including (i) providing the resource and (ii) responding to the one or more interactions with the resource;
   performing one or more performance testing cycles that each include:
      causing the server system to perform the series of operations of the performance test; and
      evaluating one or more performance measures that characterize the performance of the series of operations by the server system; and
   based on the evaluation of the one or more performance measures, providing a notification regarding the operation of the server system.

2. The method of claim 1, wherein the resource is a first resource and the performance test is a first performance test; and
   wherein the method comprises generating one or more other performance tests each involving a respective resource that is different from the first resource, the one or more other performance tests each comprising a respective series of operations that includes (i) providing the respective resource and (ii) responding to one or more interactions with the respective resource; and
   wherein performing the one or more performance testing cycles comprises performing, in each of the performance testing cycles, the first performance test and each of the one or more other performance tests.

3. The method of claim 1, wherein performing the one or more performance testing cycles comprises performing multiple performance testing cycles repeated at an interval.

4. The method of claim 1, wherein the one or more interactions comprise one or more simulated user interactions with the resource.

5. The method of claim 4, wherein the resource is a document, and wherein the one or more simulated user interactions comprise an interaction by at least one of navigating to a particular portion of the document, scrolling, editing, annotating, saving, filtering, selecting, highlighting, printing, copying, zooming, clicking, or dragging.

6. The method of claim 4, wherein the one or more simulated user interactions comprises a sequence of multiple simulated user interactions.

7. The method of claim 1, comprising, in each of the one or more performance testing cycles, determining one or more performance measures for the series of operations of the performance test, the one or more performance measures being based on:
   a duration of time to complete the series of operations;
   a duration of time to complete one or more individual operations in the series of operations;
   an amount or type of errors occurring during the series of operations; or
   an accuracy of a result of performing the series of operations.

8. The method of claim 1, comprising receiving data indicating a series of user interactions with the resource that a user designated to be included in the performance test; and
   wherein the performance test is generated to include responding to the series of user interactions with the resource.

9. The method of claim 1, wherein generating the performance test comprises:
   accessing user activity data indicating multiple sequences of user interactions with the resource over a period of time;
   selecting a subset of the user interactions with the resource based on an amount of times the respective user interactions with the resource occur in the multiple sequences of user interactions; and
   including, in the series of operations of the performance test, operations representing the interactions in the selected subset.

10. The method of claim 1, comprising:
    receiving activity data indicating user interactions with multiple resources provided by the server system;
    evaluating the activity data to identify resources that satisfy one or more criteria; and
    providing, to a user device for presentation, a recommendation of one or more identified resources to be tested during the one or more performance testing cycles.

11. The method of claim 1, comprising:
    receiving activity data indicating user interactions with the resource;
    evaluating the activity data to identify a sequence of multiple user interactions that was performed at least a threshold number of times; and
    providing, to a user device for presentation, a recommendation of the sequence of multiple user interactions to be tested in the performance test.

12. The method of claim 1, wherein the performance test includes operations that simulate loading of a specific document, presenting a specific portion of the specific document, and activating one or more interactive user interface controls available for the specific portion of the specific document.

13. The method of claim 1, comprising, based on the evaluation of the one or more performance measures, adjusting one or more operating parameters of the server system.

14. A system comprising:
    one or more computers; and one or more computer-readable media storing instructions that, when executed by the one or more computers, cause the one or more computers to perform operations comprising:
  identifying, by the one or more computers, a resource provided by a server system;
  determining, by the one or more computers, one or more interactions to be tested for the resource, the one or more interactions being determined based on user input or records of prior user interactions;
  generating, by the one or more computers, a performance test for the server system, the performance test comprising a series of operations for the server system to perform including (i) providing the resource and (ii) responding to the one or more interactions with the resource;
  performing one or more performance testing cycles that each include:
    causing the server system to perform the series of operations of the performance test; and
    evaluating one or more performance measures that characterize the performance of the series of operations by the server system; and
  based on the evaluation of the one or more performance measures, providing a notification regarding the operation of the server system.

15. The system of claim 14, wherein the one or more interactions comprise one or more simulated user interactions with the resource.

16. The system of claim 14, wherein the operations comprise:
  receiving activity data indicating user interactions with multiple resources provided by the server system;
  evaluating the activity data to identify resources that satisfy one or more criteria; and
  providing, to a user device for presentation, a recommendation of one or more identified resources to be tested during the one or more performance testing cycles.

17. The system of claim 14, wherein the operations comprise:
  receiving activity data indicating user interactions with the resource;
  evaluating the activity data to identify a sequence of multiple user interactions that was performed at least a threshold number of times; and
  providing, to a user device for presentation, a recommendation of the sequence of multiple user interactions to be tested in the performance test.

18. The system of claim 14, wherein the performance test includes operations that simulate loading of a specific document, presenting a specific portion of the specific document, and activating one or more interactive user interface controls available for the specific portion of the specific document.

19. One or more non-transitory computer-readable media storing instructions that, when executed by one or more computers, cause the one or more computers to perform operations comprising:
  identifying, by the one or more computers, a resource provided by a server system;
  determining, by the one or more computers, one or more interactions to be tested for the resource, the one or more interactions being determined based on user input or records of prior user interactions;
  generating, by the one or more computers, a performance test for the server system, the performance test comprising a series of operations for the server system to perform including (i) providing the resource and (ii) responding to the one or more interactions with the resource;
  performing one or more performance testing cycles that each include:
    causing the server system to perform the series of operations of the performance test; and
    evaluating one or more performance measures that characterize the performance of the series of operations by the server system; and
  based on the evaluation of the one or more performance measures, adjusting one or more configuration settings of the server system.

20. A method performed by one or more computers, the method comprising:
  identifying, by the one or more computers, a resource provided by a server system;
  determining, by the one or more computers, one or more interactions to be tested for the resource, the one or more interactions being determined based on user input or records of prior user interactions;
  generating, by the one or more computers, a performance test for the server system, the performance test comprising a series of operations for the server system to perform including (i) providing the resource and (ii) responding to the one or more interactions with the resource;
  performing one or more performance testing cycles that each include:
    causing the server system to perform the series of operations of the performance test; and
    evaluating one or more performance measures that characterize the performance of the series of operations by the server system; and
  based on the evaluation of the one or more performance measures, adjusting one or more configuration settings of the server system.

21. The method of claim 20, wherein adjusting the one or more configuration settings of the server system based on the evaluation of the one or more performance measures comprises: based on the evaluation indicating a decrease in performance of the server system, allocating additional hardware resources to the server system.

* * * * *